US012596429B1

(12) United States Patent
Lee et al.

(10) Patent No.: US 12,596,429 B1
(45) Date of Patent: Apr. 7, 2026

(54) DYNAMIC MODIFICATION OF AN EXPERIENCE BASED ON SCENE UNDERSTANDING, USER STATE, AND USER POSITION

(71) Applicant: Apple Inc., Cupertino, CA (US)

(72) Inventors: Joanne Lee, Sunnyvale, CA (US); Connor A. Smith, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 18/117,225

(22) Filed: Mar. 3, 2023

Related U.S. Application Data

(60) Provisional application No. 63/319,855, filed on Mar. 15, 2022.

(51) Int. Cl.
| | |
|---|---|
| *G06F 3/01* | (2006.01) |
| *G06T 19/00* | (2011.01) |
| *G06V 20/20* | (2022.01) |

(52) U.S. Cl.
CPC ............ *G06F 3/011* (2013.01); *G06T 19/003* (2013.01); *G06V 20/20* (2022.01)

(58) Field of Classification Search
CPC ........ G06F 3/011; G06T 19/003; G06V 20/20
USPC ........................................................ 345/633
See application file for complete search history.

(56) References Cited

U.S. PATENT DOCUMENTS

| | | | |
|---|---|---|---|
| 9,612,654 | B2 | 4/2017 | Brokken et al. |
| 9,727,946 | B2 | 8/2017 | Scherlen |
| 10,606,353 | B2 | 3/2020 | Ce Coleman et al. |
| 11,307,650 | B1 | 4/2022 | Guerra et al. |
| 11,364,361 | B2 | 6/2022 | Poltorak |

(Continued)

FOREIGN PATENT DOCUMENTS

| | | |
|---|---|---|
| CN | 1998219 | 7/2007 |
| CN | 101198277 A | 6/2008 |

(Continued)

OTHER PUBLICATIONS

Parsons, T.D. et al., "Adaptive Virtual Environments for Neuropsychological Assessment in Serious Games," IEEE Transactions on Consumer Electronics, vol. 58, No. 2, pp. 197-204 (May 2012) 2012.

(Continued)

*Primary Examiner* — James A Thompson
*Assistant Examiner* — Kim Thanh T Tran
(74) *Attorney, Agent, or Firm* — Thompson Hine LLP

(57) ABSTRACT

Various implementations disclosed herein include devices, systems, and methods that assess a scene understanding of a physical environment, a user state, and a position of user in the physical environment based on sensor data, and dynamically generate a sequence of content for a change of the position corresponding to the user within an extended reality (XR) environment. For example, an example process may include determining a scene understanding of a physical environment, determining a state of a user based on physiological data obtained via one or more physiological sensors, tracking a position corresponding to the user in the physical environment, generating a sequence of content within an XR environment based on the scene understanding, the state of the user, and the position corresponding to the user in the physical environment, and presenting the sequence of content.

20 Claims, 10 Drawing Sheets

(56)          References Cited

U.S. PATENT DOCUMENTS

| | | | |
|---|---|---|---|
| 11,452,839 B2 | 9/2022 | Poltorak | |
| 11,782,508 B2 | 10/2023 | Yildiz | |
| 2008/0214903 A1 | 9/2008 | Orbach | |
| 2014/0125581 A1 | 5/2014 | Chitkara et al. | |
| 2014/0316191 A1 | 10/2014 | De Zambotti | |
| 2014/0316192 A1* | 10/2014 | de Zambotti | A61B 5/486 |
| | | | 600/27 |
| 2015/0055821 A1* | 2/2015 | Fotland | G06V 10/255 |
| | | | 382/103 |
| 2015/0351655 A1* | 12/2015 | Coleman | A61B 5/0205 |
| | | | 600/595 |
| 2016/0077547 A1 | 3/2016 | Aimone et al. | |
| 2016/0180797 A1* | 6/2016 | Kamhi | G09G 5/003 |
| | | | 345/520 |
| 2017/0095732 A1 | 4/2017 | Ghaffari | |
| 2017/0265798 A1 | 9/2017 | Sales | |
| 2017/0323481 A1 | 11/2017 | Tran et al. | |
| 2018/0262362 A1 | 9/2018 | Goldstein | |
| 2019/0019089 A1 | 1/2019 | Baughman et al. | |
| 2019/0163258 A1 | 5/2019 | Baughman et al. | |
| 2019/0223746 A1 | 7/2019 | Intrator | |
| 2019/0269345 A1 | 9/2019 | Sriram | |
| 2019/0388647 A1* | 12/2019 | Bender | G06F 3/011 |
| 2020/0004321 A1 | 1/2020 | Kawano | |
| 2020/0344508 A1 | 10/2020 | Edwards | |
| 2020/0390337 A1 | 12/2020 | Frank et al. | |
| 2021/0030308 A1 | 2/2021 | Grace et al. | |
| 2021/0041953 A1 | 2/2021 | Poltorak | |
| 2021/0096646 A1 | 4/2021 | Yildiz | |
| 2021/0345905 A1 | 11/2021 | Liu et al. | |
| 2021/0349536 A1 | 11/2021 | Crispin et al. | |
| 2022/0001238 A1* | 1/2022 | Kwatra | G06T 19/006 |
| 2023/0418378 A1 | 12/2023 | Yildiz | |
| 2024/0115831 A1 | 4/2024 | Welch | |
| 2024/0296002 A1* | 9/2024 | Ive | G06T 11/60 |
| 2024/0402807 A1 | 12/2024 | Yildiz | |

FOREIGN PATENT DOCUMENTS

| | | |
|---|---|---|
| CN | 108290070 A | 7/2018 |
| CN | 108572724 A | 9/2018 |
| WO | WO2014015378 A1 | 1/2014 |
| WO | WO2019067731 A1 | 4/2019 |
| WO | 2023283161 A1 | 1/2023 |

OTHER PUBLICATIONS

Dauden Roquet, C. and Sas, C., "Body Matters: Exploration of the Human Body as a Resource for the Design of Technologies for Meditation," Proceedings of the 2020 ACM Designing Interactive Systems Conference, ACMPUB27, New York, NY, pp. 533-546, 2020 2020.

Gromala, Diane; Tong, Xin; Choo, Amber; Karamnejad, Mehdi; Shaw, Chris D.; "The Virtual Meditative Walk: Virtual Reality Therapy for Chronic Pain Management"; Making & Sharing Assistive Technologies; CHI 2015, Crossings, Seoul, Korea; Apr. 18-23, 2015, pp. 521-524.

Rockstroh, Christoph; Blum, Johannes; Hardt, Veronique; Goriz, Anja S.; "Design and Evaluation of a Virtual Restorative Walk with Room-Scale Virtual Reality and Impossible Spaces"; Frontiers in Virtual Reality; Nov. 20, 2020; pp. 1-13.

Hinkle, Lee B.; Roudposhti, Kamrad Khoshhal; Metsis, Vangelis; "Physiological Measurement for Emotion Recognition in Virtual Reality"; 2019 2nd International Conference on Data Intelligence and Security (ICDIS); pp. 1-8.

Quesnel, Denise; Stepanova, Ekaterina R.; Aguilar, Ivan A.; Pennefather, Patrick; Riecke, Bernhard E.; "Creating AWE: Artistic and scientific practices in research-based design for exploring a profound immersive installation"; 2018 IEEE Games, Entertainment, Media Conference (GEM); pp. 200-207.

* cited by examiner

600

900

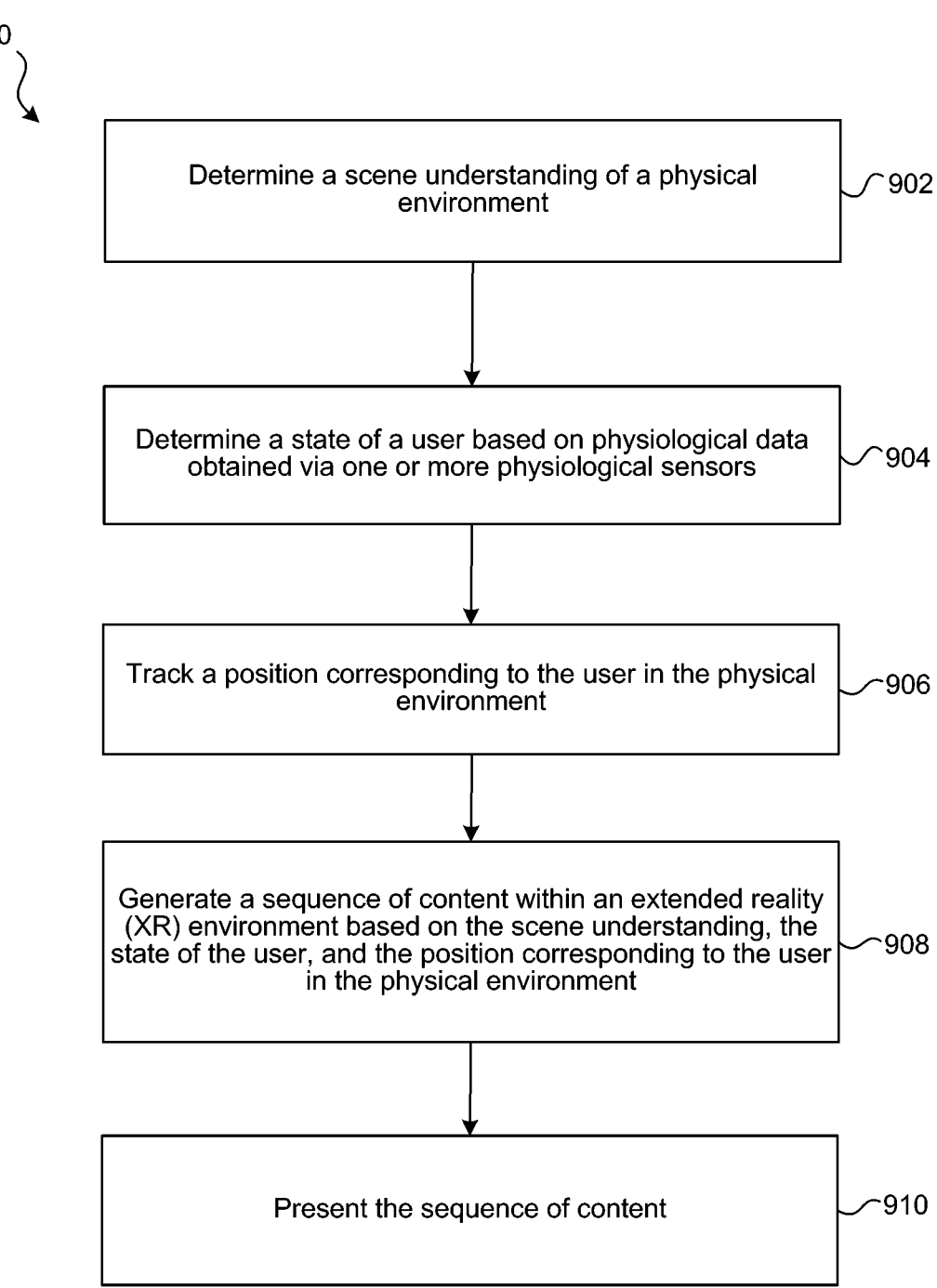

Determine a scene understanding of a physical environment ⌐902

Determine a state of a user based on physiological data obtained via one or more physiological sensors ⌐904

Track a position corresponding to the user in the physical environment ⌐906

Generate a sequence of content within an extended reality (XR) environment based on the scene understanding, the state of the user, and the position corresponding to the user in the physical environment ⌐908

Present the sequence of content ⌐910

FIG. 9

Device 1000

DYNAMIC MODIFICATION OF AN EXPERIENCE BASED ON SCENE UNDERSTANDING, USER STATE, AND USER POSITION

CROSS-REFERENCE TO RELATED APPLICATIONS

This application claims the benefit of U.S. Provisional Application Ser. No. 63/319,855 filed on Mar. 15, 2022, which is incorporated herein in its entirety.

TECHNICAL FIELD

The present disclosure generally relates to presenting content via electronic devices, and in particular, to systems, methods, and devices that determine a scene understanding, a user's state, and a user's position during and/or based on the presentation of electronic content.

BACKGROUND

Electronic devices may be used to help users engage in various experiences in which particular user states are desired. For example, an electronic device may be used to present content that guides a user through a meditation experience in which the user desires to relax and walk along a path. Such content is generally not responsive or adaptive to the user's actual state and thus may not be as effective or efficient as desired.

SUMMARY

Various implementations disclosed herein include devices, systems, and methods that present content to facilitate a user walking during a mediation experience in an extended reality (XR) experience. The system can use a scene understanding (e.g., identification and location of objects within a physical environment), user state (e.g., attentive state), and user position within a physical environment to tailor a dynamic/closed loop experience. Additionally, the system may guide the user along an appropriate walking path in the XR experience (e.g., to ensure the user doesn't walk into an object in the physical environment while immersed in the meditation XR experience).

In some implementations, the techniques described herein can assess a state of a user such as respiratory state (e.g., 7 breaths per minute, etc.) and/or an attention state (e.g., whether focused or mind wandering) based on physiological data (e.g., heart rate, respiration rate, body temperature, electrocardiogram, blood oxygen saturation, skin conductance, and the like) and modify (e.g., enhance) the content based on the state of the user. For example, a visual and/or audio notification may be provided to the user as they walk along a path to focus on breathing.

A user's physiological state while viewing and/or listening to content on an electronic device can have a significant effect on the user's experience. For example, staying focused and engaged may be required for meaningful experiences, such as meditation, watching educational or entertaining content, learning a new skill, and the like. Improved techniques for assessing the user states of users viewing and interacting with content may enhance a user's enjoyment, comprehension, and learning of the content. Moreover, content may not be presented in a way that makes sense to a particular user. Content creators and systems may be able to provide better and more tailored user experiences that a user is more likely to enjoy, comprehend, and learn from based on user state information (e.g., a more meaningful meditation experience).

In an exemplary implementation, devices, systems, and methods facilitate meditation based on tracking a user's state and location using physiological sensors and location tracking sensors, respectively. The meditation may (but does not necessarily) guide the user to be attentive to his or her breathing. The system may identify a baseline user state and a goal user state and enhance the experience to achieve the goal. In addition to respiration and attention, sensor data may be used to determine electroencephalography (EEG), temperature (e.g., on nose), heartrate (e.g., on forehead), and the like. In some implementations, the content enhancement may be selected based on a characteristic of an environment of the user (e.g., real-world physical environment, a virtual environment, or a combination of each). The device (e.g., a handheld, laptop, desktop, or head-mounted device (HMD)) provides content (e.g., a visual and/or auditory experience) corresponding to the real-world physical environment, a virtual reality environment, or a combination of such environments to the user. The content (e.g., an XR environment) may be enhanced visual/audio content and guidance that provides a closed loop meditation experience based on real time bio-feedback.

In some implementations, the device obtains, with one or more sensors, physiological data (e.g., respiratory data, image data (facial, body, etc.), EEG amplitude, pupil modulation, eye gaze saccades, etc.) associated with the user. Based on the obtained physiological data, some of the techniques described herein determine a state of a user (e.g., attentive, mind-wandering, etc.) during the experience (e.g., a meditation experience). For example, some implementations may identify that the user's eye characteristic (e.g., blink rate, stable gaze direction, saccade amplitude/velocity, and/or pupil radius) correspond to a "focused" attention state rather than a "mind wandering" attention state. Based on the physiological data and associated physiological response, the techniques can provide feedback to the user that the current user state differs from an intended state of the experience, recommend similar content or similar portions of the experience, and/or adjust, enhance, or otherwise modify the content, including, but not limited to, adjusting the path of the user walking.

In some implementations, a content modification may be the start or end of a meditation experience or a change during an ongoing experience. Some implementations may provide a visualization of a current respiratory state or a desired/improved respiratory state. For example, respiratory oscillations may be visualized by the user by displaying a shrinking and enlarging flower (e.g., for each breath), or a virtual candle being blown out by the user's breath. Some implementations may use subtle cues to change from lighter to darker ambience and/or bells, audio, or chimes. Some implementations may escalate explicitness from subtle cues (e.g., small icons that blend with the background) to direct instructions (e.g., "control your breathing"). Some implementations may use spatialized audio to redirect attention (e.g., a bird chirping at a particular location of the content). Some implementations may provide simultaneous/combined feedback regarding the current and desired respiratory state and/or attention state.

Some implementations improve user state assessment accuracy, e.g., improving the assessment of a user's attention to a task (e.g., notifying the user they are mind wandering and/or not breathing appropriately during a meditation experience, notify the user to alter a current walking path, and/or change a level of immersion to present more of the physical environment instead of the virtual meditation environment). Some implementations improve user experiences by providing assessments (e.g., attention/respiration assessments) that minimize or avoid interrupting or disturbing user experiences, for example, without significantly interrupting a user's attention or ability to perform a task.

In some implementations, the respiratory rate (e.g., breath tracking) may involve sensor fusion of two or more different sensor data. For example, head pose from an inertial measurement unit (IMU), audio from a microphone, images from one or more cameras (e.g., a jaw cam, a down cam of the body, an eye cam for tissue around the eye, and the like), motion of the body, and/or signal of the face modulated by the breath (e.g., remote photoplethysmogram (PPG)). Using this type of sensor fusion to track the breathing of the user, such as while wearing an HMD, may negate the need for a user to wear a sensor worn around the user's diaphragm, for example.

Physiological response data, such as EEG amplitude/frequency, pupil modulation, eye gaze saccades, etc., can depend on the attention state of an individual and characteristics of the scene in front of him or her and the content enhancement that is presented therein. Physiological response data can be obtained while using a device with eye tracking technology while users perform tasks that demand varying levels of attention, such as focused attention to a meditation or educational video (e.g., an instructional cooking video). In some implementations, physiological response data can be obtained using other sensors, such as EEG sensors. Observing repeated measures of physiological response data to an experience can give insights about the underlying user state of the user at different time scales. These metrics of respiration and attention can be used to provide feedback during a learning experience.

Some implementations use scene analysis that identifies relevant areas of the content (e.g., creating an attention map based on object detection, facial recognition, etc.) to determine what the person is looking at during the presentation of content. Such scene analysis and/or determination of a looked upon object may be used to improve the determination of the state of the user.

In some implementations, meditation may be recommended (e.g., at a particular time, place, task, etc.) based on the state of the user (e.g., focused, distracted, etc.) by identifying a type or characteristic of the recommended meditation based on various factors (e.g., physical environment context, scene understanding of what the user is seeing in an XR environment, and the like). For example, one type of meditation may be recommended in one circumstance (e.g., mindfulness meditation for mind wandering) and a different type of meditation may be recommended in another circumstance (e.g., movement/physical meditation for distracted or anxiety situations). If the user wants a focused-attention session (e.g., focused on a single task like watching a video) and if it is detected that the user is distracted, an open-monitoring meditation can be recommended. For example, open monitoring meditation can allow and/or encourage the user to notice multiple sounds/visuals/thoughts in the environment, and could replenish his or her ability to focus on a single item. Additionally, or alternatively, if the user wants to multi-task using various applications, and the system detects that the user is overwhelmed, the system could suggest that he or she perform focus-attention mediation techniques (e.g., attention to breath by focusing on a breathing monitor icon, such as a flower that moves with each breath or blowing out a candle). The focus-attention mediation techniques could allow the user to regain the ability to focus on a single item at a time. In an exemplary implementation, a meditation session could be initiated for the user which may be in opposition of the main task that he or she is aiming to accomplish such that he or she can relax/replenish during meditation and return to task at hand more effectively.

Experiences other than meditation experiences can utilize the techniques described herein regarding assessing user states, scene understanding, and user position information. For example, an educational experience could notify a pupil to focus on an education task when he or she appears to be mind wandering. Another example may be a workplace experience of notifying a worker who needs to be focused on his or her current task. For example, providing feedback to a surgeon who may be experiencing minor fatigue during a long surgery, alerting a truck driver on a long drive that he or she is losing focus and may need to pull over to sleep, and the like. The techniques described herein can be customized to any user and experience that may need some type of content enhancement to enter or maintain one or more particular user states.

Some implementations assess physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user should have the ability to access and otherwise find out anything that the system has collected or determined about him or her.

In general, one innovative aspect of the subject matter described in this specification can be embodied in methods, at a device having a processor, that include the actions of determining a scene understanding of a physical environment, where the scene understanding is determined based on obtaining sensor data corresponding to the physical environment, determining a state of a user based on physiological data obtained via one or more physiological sensors, tracking a position corresponding to the user in the physical environment, generating a sequence of content within an extended reality (XR) environment, wherein the sequence of content is determined based on the scene understanding, the state of the user, and the position corresponding to the user in the physical environment, and presenting the sequence of content.

These and other embodiments can each optionally include one or more of the following features.

In some aspects, generating the sequence of content includes determining a guiding path based on the scene understanding, the state of the user, and the position corresponding to the user in the physical environment.

In some aspects, presenting the sequence of content includes displaying guiding indicators to guide the user to move the device to a new position associated with the guiding path.

In some aspects, the sequence of content includes initiation of a new meditation, conclusion of a meditation, or changing of an ongoing meditation. In some aspects, the sequence of content includes a visual or audible representation of the state of the user or a change to the state of the user. In some aspects, the sequence of content includes a cue configured to trigger a change in the state of the user.

In some aspects, determining the scene understanding of the physical environment includes identifying one or more objects in the physical environment based on the sensor data, and determining a position for the one or more objects. In some aspects, generating the sequence of content includes modifying an appearance of the one or more objects based on the position for the one or more objects based on the state of the user.

In some aspects, the state of the user is determined based on a body pose or movement state, and wherein generating the sequence of content includes in accordance with a determination that the state of the user is standing or moving, generating the sequence of content to include a mixed reality walking meditation experience, and in accordance with a determination that the state of the user is sitting or stationary, generating the sequence of content to include a virtual reality meditation experience.

In some aspects, the method further includes determining a baseline corresponding to the user based on the physiological data, determining a goal for the user based on the baseline, and modifying the sequence of content based on the baseline and the goal.

In some aspects, the device includes a head-mounted device (HMD).

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 9 is a flowchart representation of a method for assessing a scene understanding of a physical environment, a user state, and a position of user in the physical environment based on sensor data, and generating a sequence of content for a change of the position corresponding to the user within an XR environment in accordance with some implementations.

Figure 2:
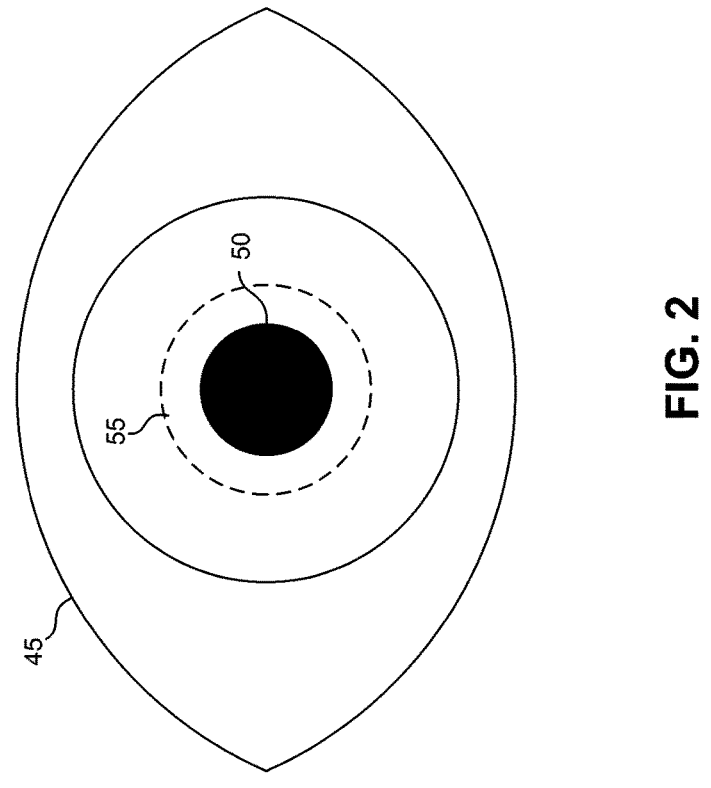
FIG. 2 illustrates a pupil of the user of FIG. 1 in which the diameter of the pupil varies with time in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
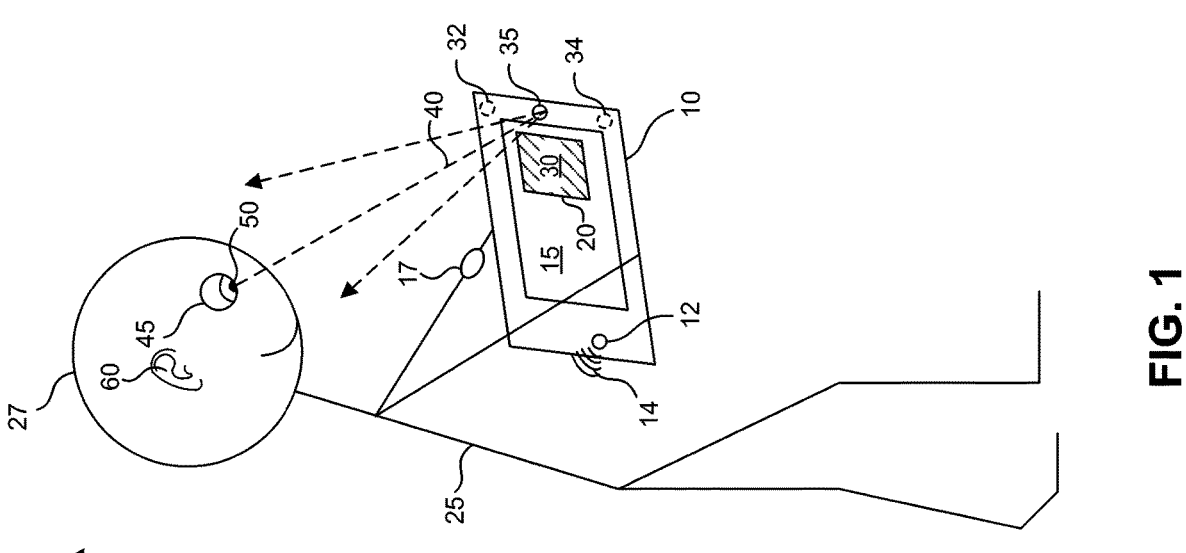
FIG. 1 illustrates a device presenting a visual and/or auditory experience and obtaining physiological data from a user in accordance with some implementations.

FIG. 1 illustrates a real-world physical environment 5 including a device 10 with a display 15. In some implementations, the device 10 displays content 20 to a user 25, and a visual characteristic 30 that is associated with content 20. For example, content 20 may be a button, a user interface icon, a text box, a graphic, etc. In some implementations, the visual characteristic 30 associated with content 20 includes visual characteristics such as hue, saturation, size, shape, spatial frequency, motion, highlighting, etc. For example, content 20 may be displayed with a visual characteristic 30 of a color highlighting covering or surrounding content 20.

In some implementations, content 20 may be a visual experience (e.g., a meditation experience), and the visual characteristic 30 of the visual experience may continuously change during the visual experience. As used herein, the phrase "experience" refers to a period of time during which a user uses an electronic device that measures one or more respiratory state and/or attention state using physiological data streams. In one example, a user has an experience in which the user perceives a real-world physical environment while holding, wearing, or being proximate to an electronic device that includes one or more sensors that obtain physiological data that is indicative of the state of the user. In another example, a user has an experience in which the user perceives content displayed by an electronic device while the same or another electronic obtains physiological data (e.g., pupil data, EEG data, etc.) to assess the state of the user. In another example, a user has an experience in which the user holds, wears, or is proximate to an electronic device that provides a series of audible or visual instructions that guide the experience. For example, the instructions may instruct the user to maintain or try to maintain a particular respiratory state (e.g., 7 breaths per minute (BPM)) and attention state (e.g., focus on a particular visual and/or audio element) during particular time segments of the experience. For example, instructing the user to focus on his or her breathing and paying attention to a particular portion of a meditation video, etc. During such an experience, the same or another electronic device may obtain physiological data from one or more sensors to assess the state of the user.

In some implementations, the visual characteristic 30 is a content enhancement or content modification for the user that is specific to the experience (e.g., a visual or audio cue to focus on a particular task during an experience, such as paying attention during a particular part of a meditation or education/learning experience). In some implementations, the visual experience (e.g., content 20) can occupy the entire display area of display 15. For example, during a meditation experience, content 20 may be a video or sequence of images that may include visual and/or audio cues as the visual characteristic 30 presented to the user to pay attention to a particular meditation technique. Other visual experiences that can be displayed for content 20 and visual and/or audio cues for the visual characteristic 30 will be further discussed herein.

The device 10 obtains physiological data (e.g., EEG amplitude/frequency, pupil modulation, eye gaze saccades, etc.) from the user 25 via a sensor 35 (e.g., a user facing camera). For example, the device 10 obtains pupillary data 40 (e.g., eye gaze characteristic data). While this example and other examples discussed herein illustrate a single device 10 in a real-world physical environment 5, the techniques disclosed herein are applicable to multiple devices and multiple sensors, as well as to other real-world environments/experiences. For example, the functions of device 10 may be performed by multiple devices.

In some implementations, as illustrated in FIG. 1, the device 10 includes additional sensors, 32 and 34, for obtaining image data of the physical environment. For example, sensors 32 and 34 are on the back of device 10, facing away from the user 25, such that the user would be facing the environment and capturing images and/or depth data of the current environment (e.g., for determining a scene understanding as further discussed herein).

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable head mounted display (HMD).

In some implementations, the device 10 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content shown on the near-eye display of the device 10. Additional camera's may be included to capture other areas of the user (e.g., an HMD with a jaw cam to view the user's mouth, a down cam to view the body, an eye cam for tissue around the eye, and the like). These cameras and other sensors can detect motion of the body, and/or signals of the face modulated by the breathing of the user (e.g., remote PPG).

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 employs various physiological sensor, detection, or measurement systems. Detected physiological data may include, but is not limited to, EEG, electrocardiogramalectromyography (EMG), functional near infrared spectroscopy signal (fNIRS), blood pressure, skin conductance, or pupillary response. The device 10 maybe communicatively coupled to an additional sensor. For example, sensor 17 (e.g., an EDA sensor) maybe communicatively coupled to device 10 via a wired or wireless connection, and sensor 17 may be located on the skin of the user 25 (e.g., on the arm as illustrated, or placed on the hand/fingers of the user). For example, sensor 17 can be utilized for detecting EDA (e.g., skin conductance), heart rate, or other physiological data that utilizes contact with the skin of a user. Moreover, the device 10 (using one or more sensors) may concurrently detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement. In some implementations, sensor 17 is placed on the skin as part of a watch device, such as a smart watch.

In some implementations, one or both eyes 45 of the user 25, including one or both pupils 50 of the user 25 present physiological data in the form of a pupillary response (e.g., pupillary data 40). The pupillary response of the user 25 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

In some implementations, a pupillary response may be in response to an auditory feedback that one or both ears 60 of the user 25 detect (e.g., an audio notification to the user). For example, device 10 may include a speaker 12 that projects sound via sound waves 14. The device 10 may include other audio sources such as a headphone jack for headphones, a wireless connection to an external speaker, and the like.

FIG. 2 illustrates a pupil 50 of the user 25 of FIG. 1 in which the diameter of the pupil 50 varies with time. Pupil diameter tracking may be potentially indicative of a physiological state of a user. As shown in FIG. 2, a present physiological state (e.g., present pupil diameter) may vary in contrast to a past physiological state (e.g., past pupil diameter 55). For example, the present physiological state may include a present pupil diameter and a past physiological state may include a past pupil diameter.

The physiological data may vary in time and the device 10 may use the physiological data to measure one or both of a user's physiological response to the visual characteristic 30 (e.g., reading text) or the user's intention to interact with content 20. For example, when presented with content 20, which may include an interactive element, by a device 10, the user 25 may select the interactive element without requiring the user 25 to complete a physical button press. In some implementations, the physiological data may include the physiological response of a visual or an auditory stimulus of a radius of the pupil 50 after the user 25 glances at content 20, measured via eye-tracking technology (e.g., via an HMD). In some implementations, the physiological data includes EEG amplitude/frequency data measured via EEG technology, or EMG data measured from EMG sensors or motion sensors.

Figure 3A:
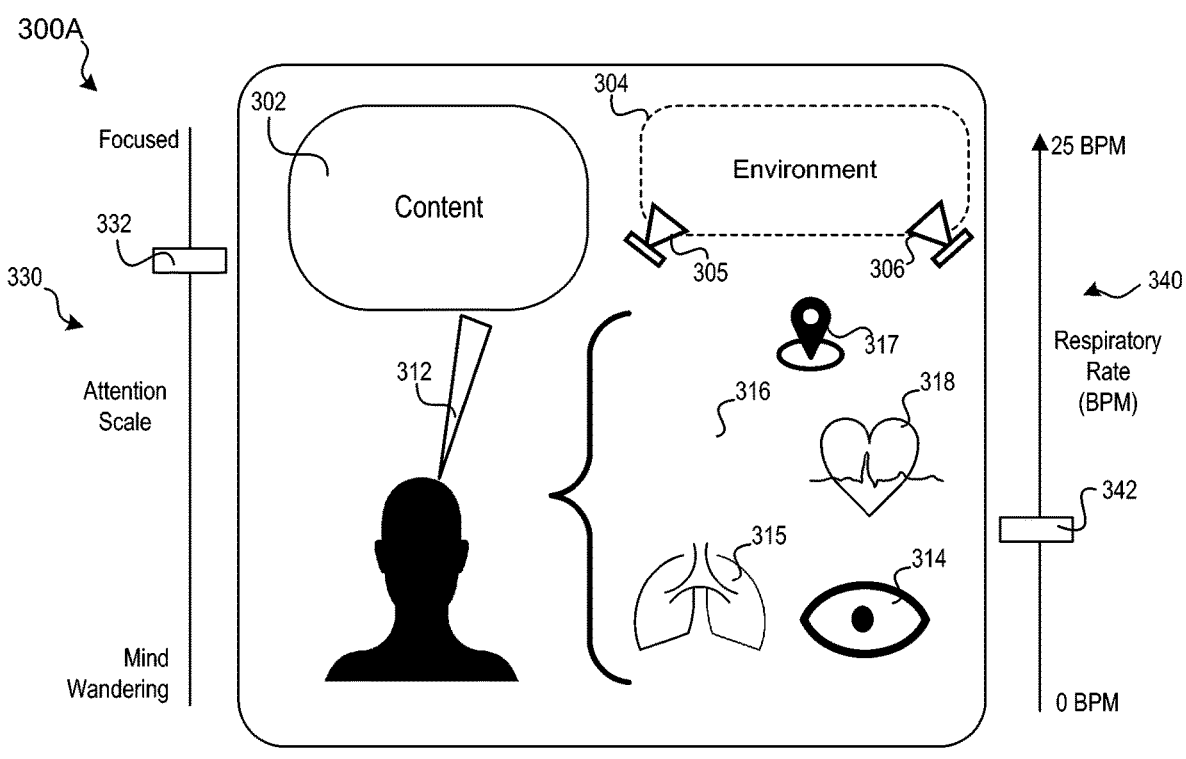
FIGS. 3A and 3B illustrate detecting a state of the user viewing content based on physiological data in accordance with some implementations.
Figure 3B:
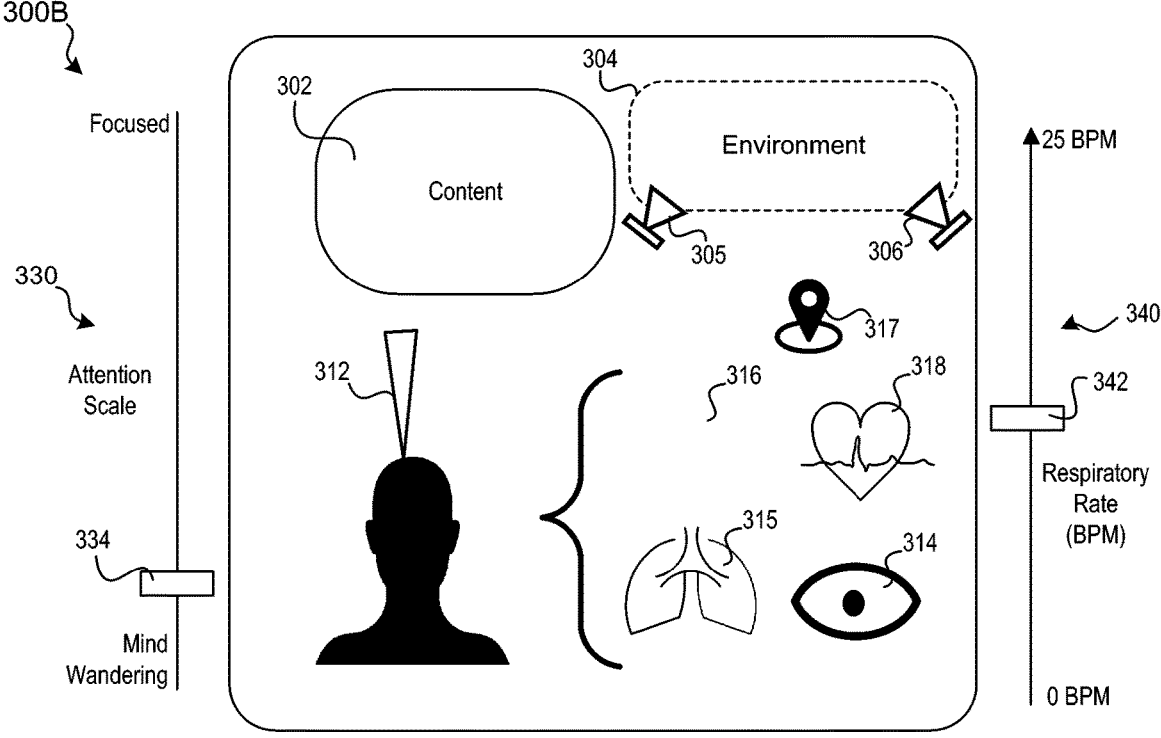

FIG. 3A and FIG. 3B illustrate assessing a user state (e.g., a respiratory state and an attention state) of a user viewing content based on obtained physiological data in accordance with some implementations. In particular, FIGS. 3A and 3B illustrate a user (e.g., user 25 of FIG. 1) being presented with content 302 in an environment 304 during a content presentation (e.g., a meditation experience) at content presentation instant 300A and later in time at content presentation instant 300B, respectively, where the user, via obtained physiological data, has a physiological response to the content (e.g., the user looks towards portions of the content as detected by eye gaze characteristic data). For example, a user is being presented with content 302 that includes visual content (e.g., a meditation video), and the user's physiological data such as eye gaze characteristic data 312, pupillary data 314, respiratory data 315, EDA data 316, and heart rate data 318 are continuously (or periodically) monitored. The physiological data may initially be obtained to determine a user's baseline data, then during an experience (e.g., a mediation session), the physiological data can be monitored and compared to the determined baseline to assess the respiratory state and the attention state of the user. In some implementations, location data 317 of the current location of the device and/or the user may be obtained (e.g., GPS data or the like) to track the user's position within the physical environment. Additionally, image data and/or depth data of the environment 304 is obtained using sensors 305 and 306 (e.g., sensors 32 and 34 of device 10 in FIG. 1).

In the particular examples of FIGS. 3A and 3B, at content presentation instant 300A, the user's eye gaze characteristic is focused on the content 302, such that the attention scale 330 shows the sliding bar indicator 332 as higher towards the "focused" portion, and a lower respiratory rate (e.g., via respiratory scale 340 showing the sliding bar indicator 342 at a lower rate). Then, at content presentation instant 300B of FIG. 3B (e.g., during a mind wandering stage), the user's eye gaze characteristic 312 appears to not be focused on the content 302, such that the attention scale 330 shows the sliding bar indicator 334 as lower towards the "mind wandering" portion, and a higher respiratory rate on the respiratory scale 340 then at content presentation instant 300A.

In some implementations, the respiratory state (e.g., via respiratory scale 340) is based on the acquired respiratory data 315 from a respiratory sensor (e.g., a sensor worn on the user). Additionally, or alternatively, respiratory data 315 may involve sensor fusion of different acquired data from device 10, without using an additional respiratory sensor. For example, the different acquired data that may be fused may include head pose data from an IMU, audio from a microphone, camera images of the user's face and/or body (e.g., an HMD with a jaw cam, down cam to view the body, eye cam for tissue around the eye, and the like), motion of the body, and/or signal of the face modulated by the breath (e.g., remote PPG). Using this type of sensor fusion to track the breathing of the user, such as while wearing an HMD, may negate the need for a user to wear a sensor worn around the user's diaphragm, for example, to track his or her respiratory rates.

In some implementations, the respiratory state and the attention state of the user viewing content is assessed based on physiological data and context data. For example, the content 302 may be analyzed by a context analysis instruction set to determine context data for the experience of the user (e.g., the experience of being present in the current physical environment while watching video content on an electronic device such as an HMD). Determining context data of the experience may involve using computer vision to generate a scene understanding of the visual and/or auditory attributes of the physical environment (e.g., environment 304), such as where is the user, what is the user doing, what objects are nearby. Additionally, or alternatively, determining context data of the experience may involve determining a scene understanding of the visual and/or auditory attributes of the content presentation (e.g., content 302, such as a video). For example, content 302 and environment 304 may include one or more people, objects, or other background objects that are within view of the user that may be detected by an objection detection algorithm, face detection algorithm, or the like.

Figure 4:
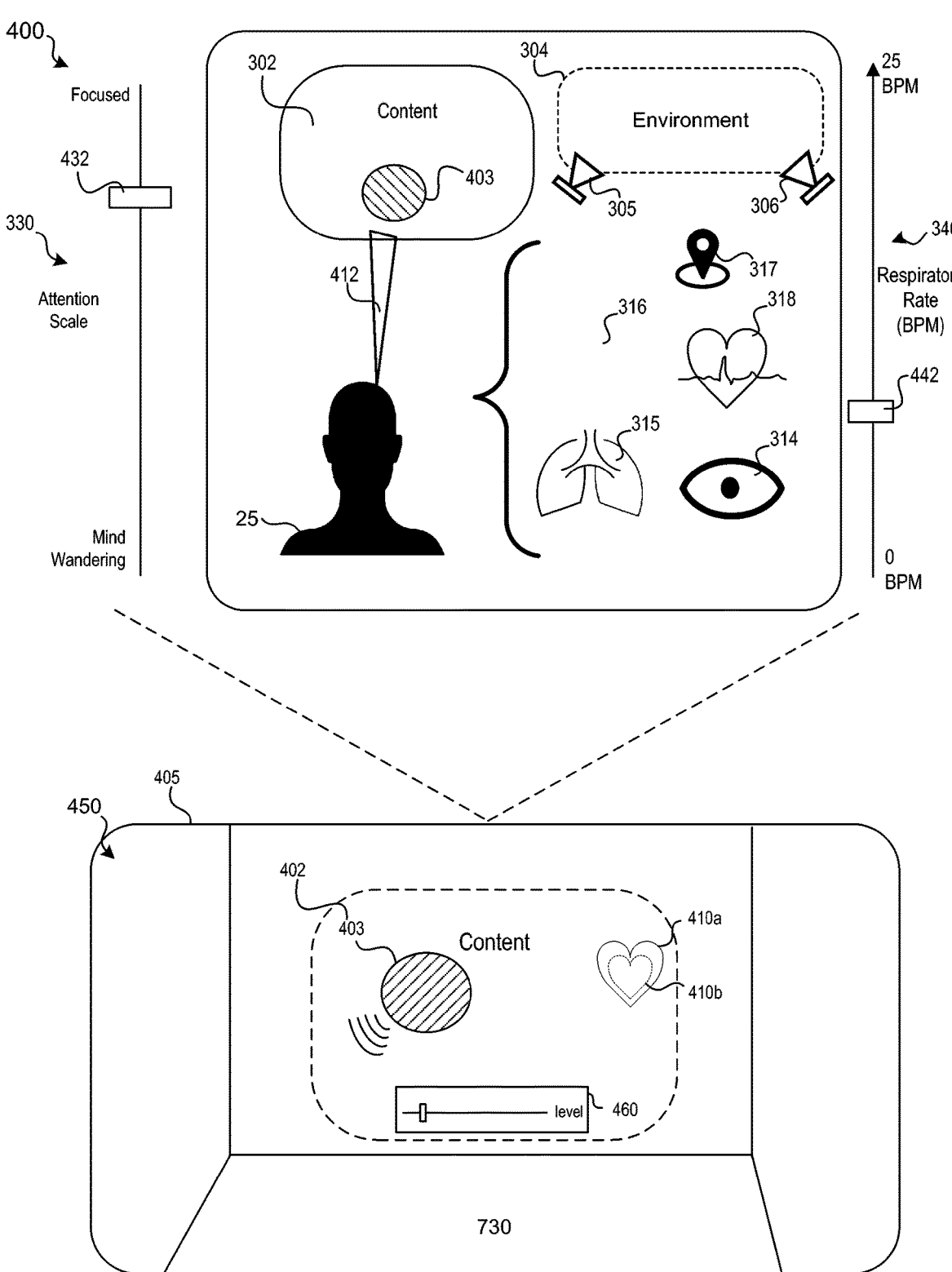
FIG. 4 illustrates a user viewing content based on tracking the scene understanding, the user's state, and the user's position in accordance with some implementations.

FIG. 4 illustrates assessing a state (e.g., respiratory state and an attention state) of a user viewing content and modifying the content based on obtained physiological data, in accordance with some implementations. The user 25 (e.g., user 25 of FIG. 1) is being presented with content 302 at content presentation instant 400 (e.g., after content presentation instant 300B) that includes visual content (e.g., a meditation video), and the user's physiological data such as eye gaze characteristic data 412, pupillary data 314, respiratory data 315, EDA data 316, and heart rate data 318 are continuously or periodically monitored. Additionally, location data 317, and image and/or depth data from sensors 305 and 305 may also be continuously or periodically monitored. In particular, FIG. 4 illustrates a user 25 being presented with content 302 in an environment 304 during a content presentation (e.g., a meditation experience) at content presentation instant 400 where the user 25, via obtained physiological data, has a physiological response to the content. For example, the user 25 looks towards portions of the content, in particular the content enhancement 403, as detected by eye gaze characteristic data 412, where the content is modified based on that response. For example, after content presentation instant 300B, where the user was determined to be "mind wandering", a content enhancement 403 is applied to the content 302. Thus, after a segment of time after the user's physiological data is analyzed (e.g., by a physiological data instruction set) and the context data of the content 302 and/or environment 304 is analyzed (e.g., by a context instruction set), content presentation instant 400 is presented to the user with a content enhancement 403 because the respiratory state and/or the attention state assessment was that the user may have exhibited higher respiratory state and/or an undesired attention state (e.g., mind wandering). FIG. 4 further illustrates the user is more "attentive" based on the attention scale 330, where the attention sliding bar indicator 432 is higher on the scale than at content presentation instant 300B when the user was mind wandering. Additionally, the user's respiratory rate is shown on the respiratory rate scale 340, where the respiratory sliding bar indicator 442 indicates a breathing rate of about 7 BPM.

FIG. 4 further illustrates an exemplary view 450 of a physical environment (e.g., real-world environment 5 of FIG. 1) provided by electronic device 405 (e.g., device 10). The view 450 may be a live camera view of the physical environment, a view of the physical environment through a see-through display, or a view generated based on a 3D model corresponding to the physical environment. The view 450 includes an application window presented on the device of content 402 (e.g., a representation of content 302). The presentation of content 402 includes the content enhancement 403 (e.g., an audio and/or visual notification). Additionally, view 450 includes a visual respiratory indicator 410 that provides the user an indication of the user's respiratory rate (e.g., as detected by the obtained physiological data—respiratory data 315). In particular, respiratory indicator 410a represents a user inhaling (e.g., taking a deep breath in thus a larger icon), and respiratory indicator 410b represents a user exhaling (e.g., taking a deep breath out thus a smaller icon). The visual respiratory indicator 410 can be used in a meditation experience to guide the user to proper breathing techniques. Alternatively, other visual indicators may be used to visualize for the user the respiratory rate (both actual and desired). For example, a sinusoidal wave of the user's respiratory rate may be shown, along with a desired sinusoidal wave that the user can try and mimic (e.g., slowing the user's respiratory rate for a particular meditation experience).

For example, a user is exhibiting a high respiratory state while at work, the content enhancement 403 may indicate the high respiratory state to the user (e.g., an audio and/or visual notification) and may provide the user with some alternative actions for calming down (e.g., meditation music, a relaxing XR environment, etc.). As illustrated, the respiratory scale 340 and the attention state scale 330 provides a possible use case of comparing the detected level of attention and respiratory rate of the user and the performance level associated with those states. For example, for the above example of exhibiting an abnormal user state (e.g., a focused or distracted level), then the content enhancement 403 could alert the user of the abnormal state to try and instruct him or her to a level within a threshold of the current experience (e.g., control the user to a controlled breath rate, e.g., 7 BPM). Additionally, the user's respiratory state and the attention state assessment can be continuously monitored throughout the presentation of the content 402.

The content enhancement 403 may include a visual presentation. For example, an icon may appear, or a text box may appear instructing the user to pay attention. In some implementations, the content enhancement 403 may include an auditory stimulus. For example, spatialized audio may be presented to redirect the user's attention towards the particular areas of the content presentation (e.g., if determined the user was exhibiting abnormal respiration levels, could steer the user's attention towards something relaxing in content).

In some implementations, the content enhancement 403 may include an entire display of visual content (e.g., a relaxation video over the entire display of the device). The content (and/or content enhancement 403) may include or provide a view of a 3D environment. Alternatively, the content enhancement 403 may include visual content around the frame of the display of the device (e.g., on a mobile device, a virtual frame of the display be created to acquire the user's attention from a particular respiratory state and the attention state). In some implementations, the content enhancement 403 may include a combination of visual content (e.g., a notification window, an icon, or other visual content described herein) and/or an auditory stimulus. For example, a notification window or arrow may direct the user to a particular content area and an audio signal may be presented that directs the user. These visual and/or auditory cues can help direct the user to particular content enhancements that can aid the user in coping with different respiratory state and the attention states to increase his or her performance levels (for a work experience), or simply for comfortable viewing of the content 302 (e.g., providing meditation if determined the user is in a stressful environment or situation).

In some implementations, as illustrated in FIG. 4, the view 450 may further include an interactive indicator 460. The interactive indicator 460 may allow the user 25 to control a level of immersion of the view 450. For example, a level of immersion may be changed that changes the percentage of blurring between a view of the real physical world and a virtual world during an XR experience (e.g., during meditation). For example, the higher the level of immersion the more virtual content the user 25 would view, and less to none of the physical environment would be visible. Alternatively, a lower level of immersion, the less virtual content would be shown, and almost an unobstructed view of the physical environment would be displayed in view 450 (such as pass-through video while wearing an HMD). Additionally, or alternatively, the interactive indicator 460 may allow a user to view and/or control other aspects of the view 450, such as controlling the level of lighting, adding a virtual content such as weather, and the like.

Figures 5A, 5B, 5C:
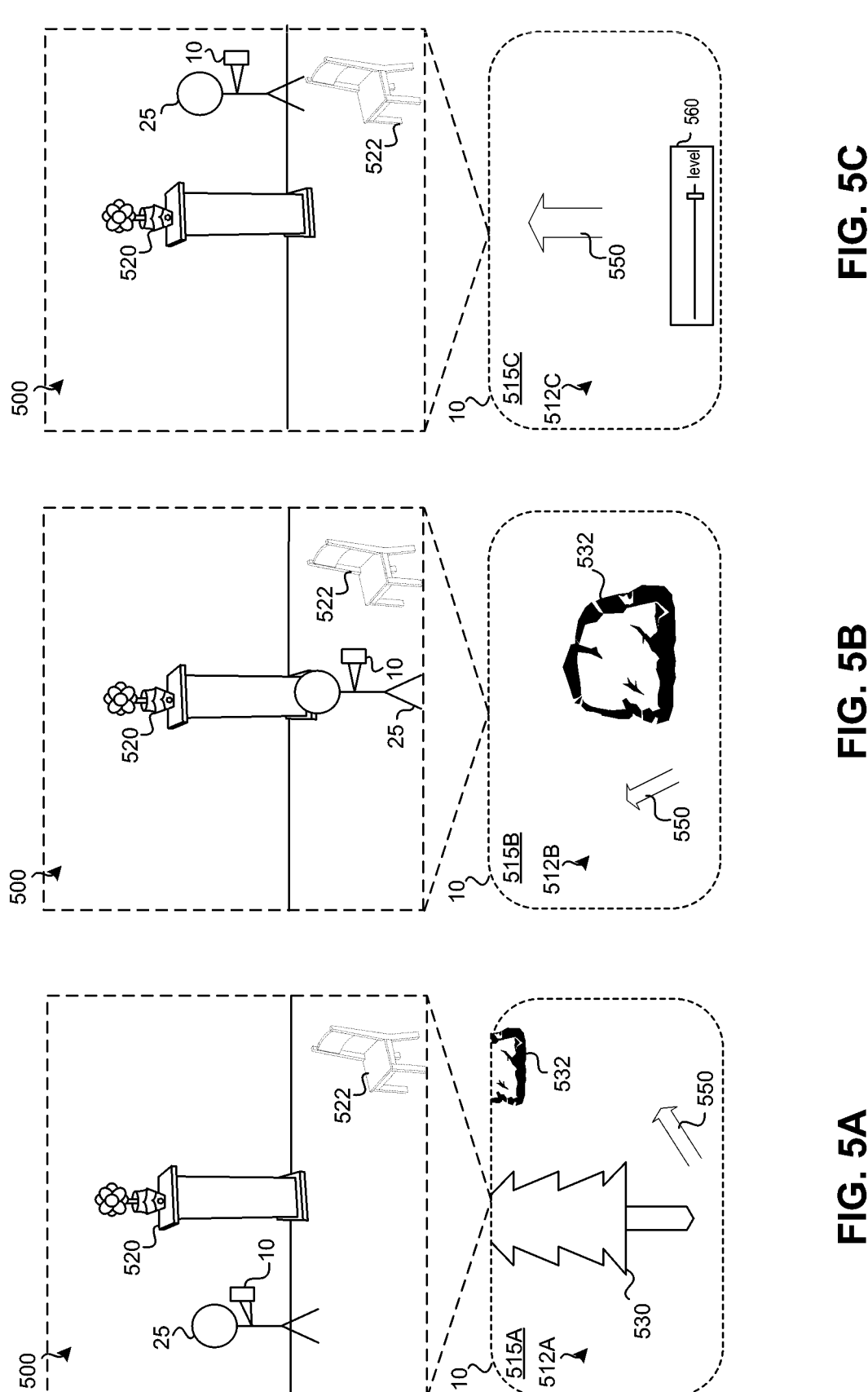
FIGS. 5A-5C illustrate exemplary views of an electronic device viewing an extended reality (XR) environment for a path traversed by a user, in accordance with some implementations.

FIGS. 5A-5C illustrate exemplary views of an electronic device viewing content for a path traversed by a user, where each view is a representation of the content recorded by the electronic device along the path in accordance with some implementations. For instance, FIGS. 5A-5C illustrate an exemplary electronic device 10 providing view 515A of 3D environment 512A, view 515B of 3D environment 512B, and view 515C of 3D environment 512C, respectively, operating in a physical environment 500 during a viewing of content (e.g., a virtual meditation experience). For example, FIGS. 5A-5C may represent a viewing of content at three different periods of time while the user 25 views content and views the physical environment 500. In these examples of FIGS. 5A-5C, the physical environment 500 is a room (e.g., a bedroom) that includes a statue 520 and a chair 522. In particular, FIG. 5A of physical environment 500, for a first period of time, illustrates user 25 (e.g., a viewer during a mediation experience) standing in front of the statue 520 while viewing content on device 10. FIG. 5B of physical environment 500, for a second period of time, illustrates user 25 walking to the right of the statue 520 and walking towards the chair 522 while viewing content on device 10. FIG. 5C of physical environment 500, for a third period of time, illustrates user 25 walking to the left the chair 522 and away from the statue 520 while viewing content on device 10.

The electronic device 10 includes one or more cameras, microphones, depth sensors, or other sensors that can be used to capture information about and evaluate the physical environment 500 and the objects within it, as well as information about the user 25 of the electronic device 10 (e.g., positional data of the user 25). The information about the physical environment 500 and/or user 25 may be used to provide visual and audio content during the meditation session. For example, a meditation session may provide views (e.g., views 515A, 515B, and 515C) of a 3D environment (e.g., 3D environment 512A, 512B, and 512C) that is generated based on camera images and/or depth camera images of the physical environment 500 and, optionally, include virtual content as part of the meditation experience to simulate a nature walker as opposed to walking in his or her own bedroom. For example, a virtual tree 530 is presented in the view 515A instead of the statue 520, and virtual rock 532 is presented in the view 515A instead of the chair 522. A meditation path may be generated based on the location of detected objects in the physical environment 500 (e.g., statue 520 and chair 522) so that the user can be presented with an indicator 550 to follow a meditation path in a virtual environment, while walking in a physical environment without running into objects. Additionally, as the user 25 follows the meditation path, the indicator 550 can lead the user 25 along the meditation path. In some implementations, depending on the size of the physical environment, the determined meditation path may be a repetitive loop within the room so the user 25 can continue to walk along the path for a particular period of time (e.g., a 20-minute meditative walk experience). For example, a set of forward-facing cameras on an HMD may be used to capture 2D or 3D video of physical environment 500 in order to continuously scan the environment for any new objects in the room, or as the user moves to other rooms, the meditation path can be continuously updated to avoid newly detected objects (e.g., a pet or a person that enters the room). In some implementations, the electronic device 10 records and shares information with another device (e.g., a viewer device of a therapist or another meditator during a copresence meditation session), or an intermediary device such as a meditation session server.

In the example illustrated in FIG. 5A, the electronic device 10 provides a view 515A that includes a virtual tree 530 in the location of the statue 520, a virtual boulder 532 in the location of the chair 522, and an indicator 550 to direct the user along the meditation path within a 3D environment 512A. Similarly, in the example illustrated in FIG. 5B, the electronic device 10 provides a view 515B that includes a virtual boulder 532 in the location of the chair 522, and an indicator 550 to direct the user along the meditation path within a 3D environment 512B, and in the example illustrated in FIG. 1C, the electronic device 10 provides a view 515C that includes an indicator 550 to direct the user along the meditation path within a 3D environment 512C. Additionally, view 515C includes an interactive indicator 560 that allows user 25 to control a level of immersion of each view 515, or to control a particular attributed within each 3D environment 512.

Figure 6:
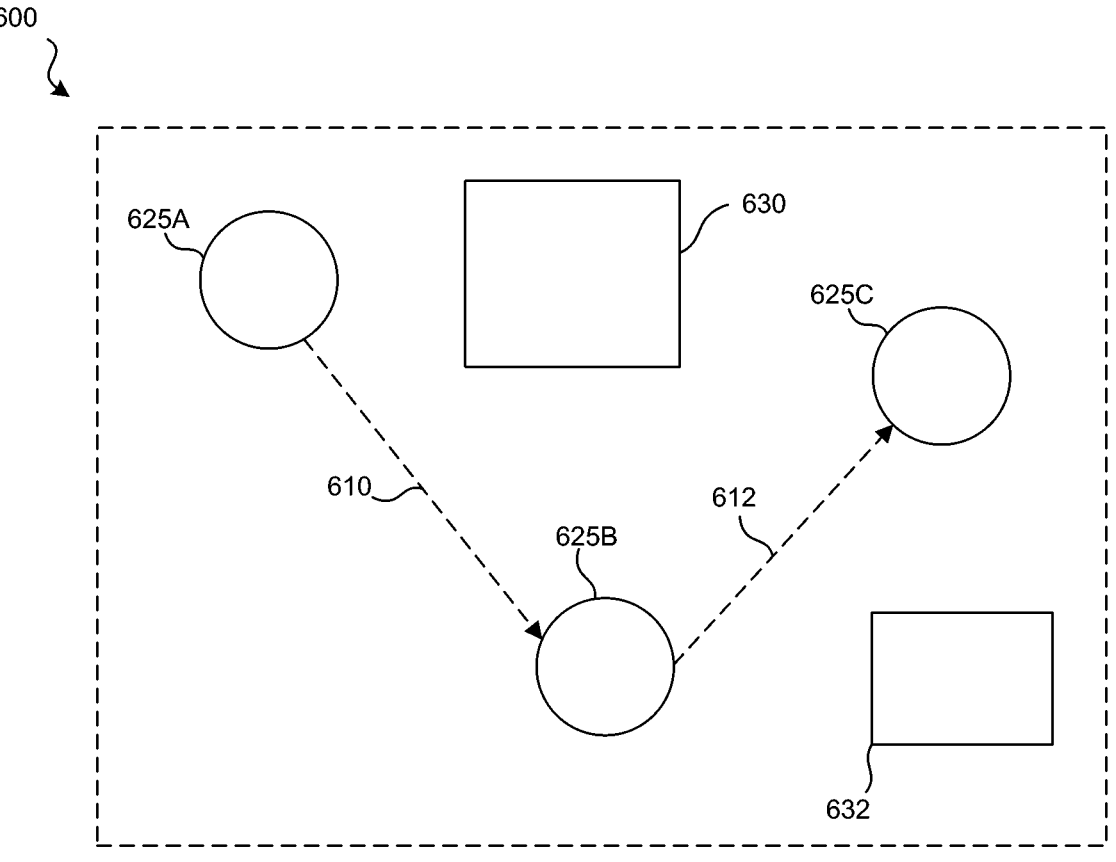
FIG. 6 illustrates an example location map based on the movement of the content creator along a path of FIGS. 5A-5C in accordance with some implementations.

FIG. 6 illustrates an example location map 600 based on the movement of the user 25 of FIGS. 5A-5C along a meditation path (e.g., path segment 610 and path segment 612) in accordance with some implementations. A location map illustrates a two-dimensional (2D) top-down view of locations of representations of users or other representations of objects within a 3D environment. In this example, during an example of following a path for a meditation session (e.g., the content of FIGS. 5A-5C within the 3D environment 512A-512C, respectively), a content or meditation session instruction set executed on an electronic device (e.g., device 10), or networked through an external server, can generate a location map 600 based on the locations of the user 25 and the location of the objects in the environment 500 (e.g., statue 520 and chair 522). For example, location indicator 630 depicts a location for statue 520 and location indicator 632 depicts a location for the chair 522. The location map 600 further illustrates the respective location for the user 25 as the user 25 moves during each respective time period. For example, as the user 25 moves from the first location (indicator 625A) to the second location (indicator 625B) illustrated in FIG. 5B (e.g., in front of the chair 522 and to the right of the statue 520), the location map 600 illustrates path segment 610 of the movement of the user 25 to the second location. As the user 25 moves to the third location (indicator 625C) as illustrated in FIG. 5C (e.g., in front of the statue 520), the location map 600 illustrates path segment 612 of the movement of the user 25 to the third location.

Figures 7A, 7B, 7C:
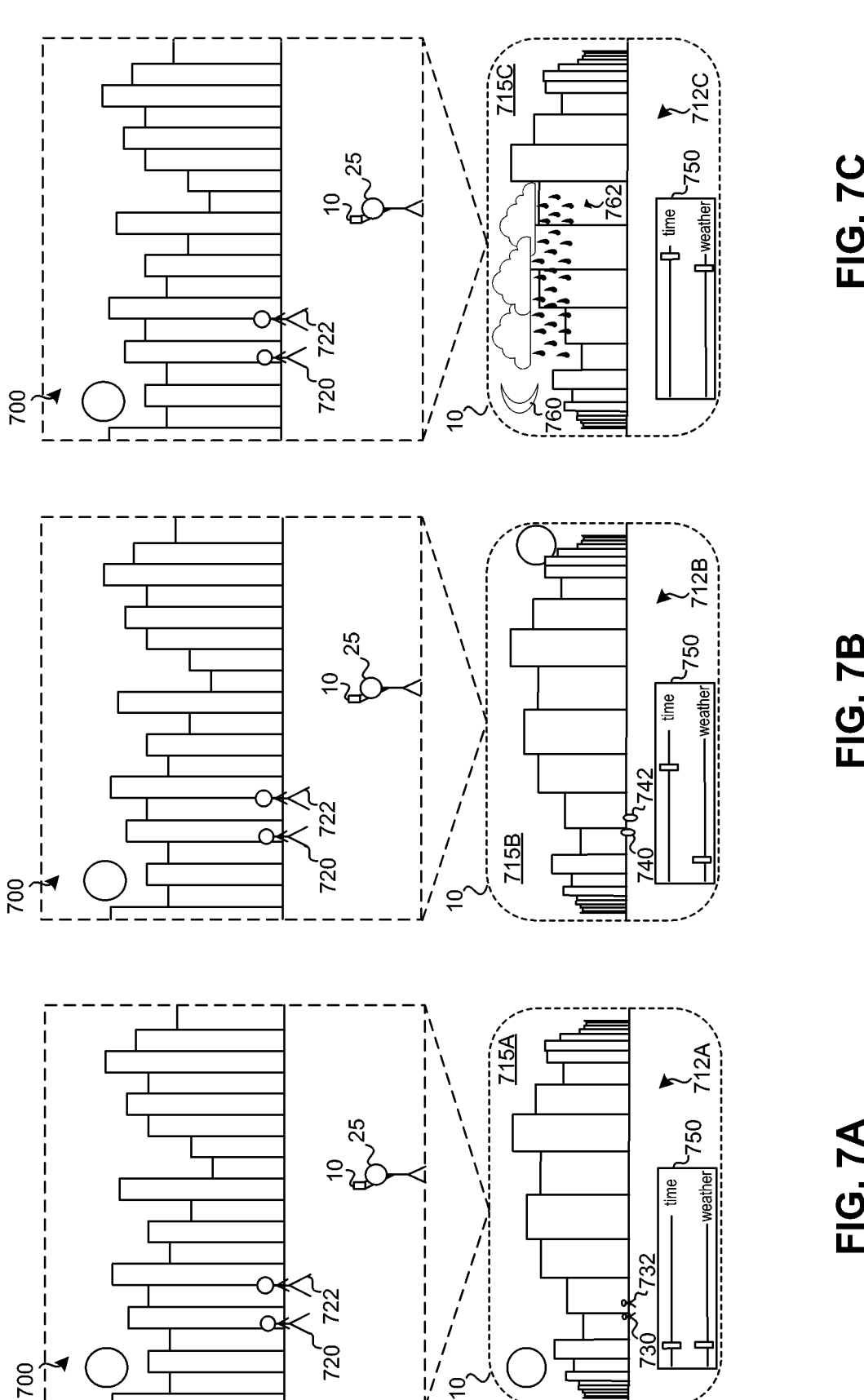
FIGS. 7A-7C illustrate exemplary views of an electronic device viewing an XR environment, in accordance with some implementations.

FIGS. 7A-7C illustrate exemplary views of an electronic device viewing an XR environment in accordance with some implementations. In particular, FIGS. 7A-7C illustrate different levels of immersion or displaying different levels of virtual content for a user viewing an XR environment. For instance, FIGS. 7A-7C illustrate an exemplary electronic device 10 providing view 715A of 3D environment 712A, view 715B of 3D environment 712B, and view 715C of 3D environment 712C, respectively, operating in a physical environment 700 during a viewing of content (e.g., a virtual meditation experience while walking in a city park). For example, FIGS. 7A-5C may represent a viewing of content at three different periods of time while the user 25 views content on the display of device 10, and views the physical environment 700. In these examples of FIGS. 7A-7C, the physical environment 700 is a city park with a city (buildings) in the background that includes bystanders 720 and 722. In particular, FIGS. 7A-7C each illustrate the user 25 (e.g., a viewer during a mediation experience) viewing content on device 10 during a sunrise (e.g., early in the morning) in a city park with the city landscape in the background.

The electronic device 10 includes one or more cameras, microphones, depth sensors, or other sensors that can be used to capture information about and evaluate the physical environment 700 and the objects within it, as well as information about the user 25 of the electronic device 10 (e.g., positional data of the user 25). The information about the physical environment 700 and/or user 25 may be used to provide visual and audio content during the meditation session. For example, a meditation session may provide views (e.g., views 515A, 515B, and 515C) of a 3D environment (e.g., 3D environment 512A, 512B, and 512C) that is generated based on camera images and/or depth camera images of the physical environment 100 and, optionally, include virtual content as part of the meditation experience to simulate a nature walk in the city park, but to supplement some of the physical content with virtual content.

In the example illustrated in FIG. 7A, the electronic device 10 provides a view 715A that includes a representation 730 of bystander 720, representation 732 of bystander 722, and further includes interactive indicator 750 that allows a user to change one or more attributes associated with the view 715A (e.g., weather, time of day (sunrise/sunset/moon), and the like). FIG. 7A provides a view 715A that mimics the environment 700, that is, shows a view that includes a representation of the sun in the same location (e.g., during a sunrise). Similarly, in the example illustrated in FIG. 7B, the electronic device 10 provides a view 715B that includes a representation 740 of bystander 720, representation 742 of bystander 722, and an interactive indicator 750. FIG. 7B provides a view 715B that has altered the time of day (e.g., now a sunset), as well as changed the appearance of the representations 740, 742 of the bystanders 720, 722, respectively. For example, the user 25, while meditating in the city park, wants to view the background of the city (e.g., while wearing an HMD) during a sunset. Additionally, the user may select, or the system may automatically, blur out or replace with virtual objects any detected object that may interfere with the user's meditation session. For example, if people are greater than a particular threshold away from the user 25 (e.g., 10 feet or greater) then the system may alter the view of the representations 740, 742 of the bystanders 720, 722, respectively, as shown (e.g., opaque ovals instead of people). Similarly, in the example illustrated in FIG. 7C, the electronic device 10 provides a view 715C that includes a representation 760 of a moon, representation 762 of rain and rain clouds, and an interactive indicator 750. FIG. 7C provides a view 715C that has altered the time of day (e.g., now at nighttime), as well as removed the representations 740, 742 of the bystanders 720, 722, respectively. For example, the user 25, while meditating in the city park, wants to view the background of the city (e.g., while wearing an HMD) during the nighttime and while it is raining.

Additionally, the user may select, or the system may automatically, blur out, replace with virtual objects, or remove any detected object that may interfere with the user's meditation session. For example, in the example of view 715C, if people are greater than a particular threshold away from the user 25 (e.g., 10 feet or greater) then the system may alter the view 715C and remove the representations 740, 742 of the bystanders 720, 722, respectively. Thus, if the bystanders 720 and/or 722 walk closer to the user (e.g. less than 20 feet), then representations 740, 742, respectively, may start to slowly fade in as they walk closer to user 25 until they reach another threshold (e.g., less than 10 feet), and then the representations 740, 742, may be completely shown, or an actual view of the bystanders 720, 722 may "breakthrough" the view 715 so that user 25 can clearly see that objects are close to them.

Figure 8:
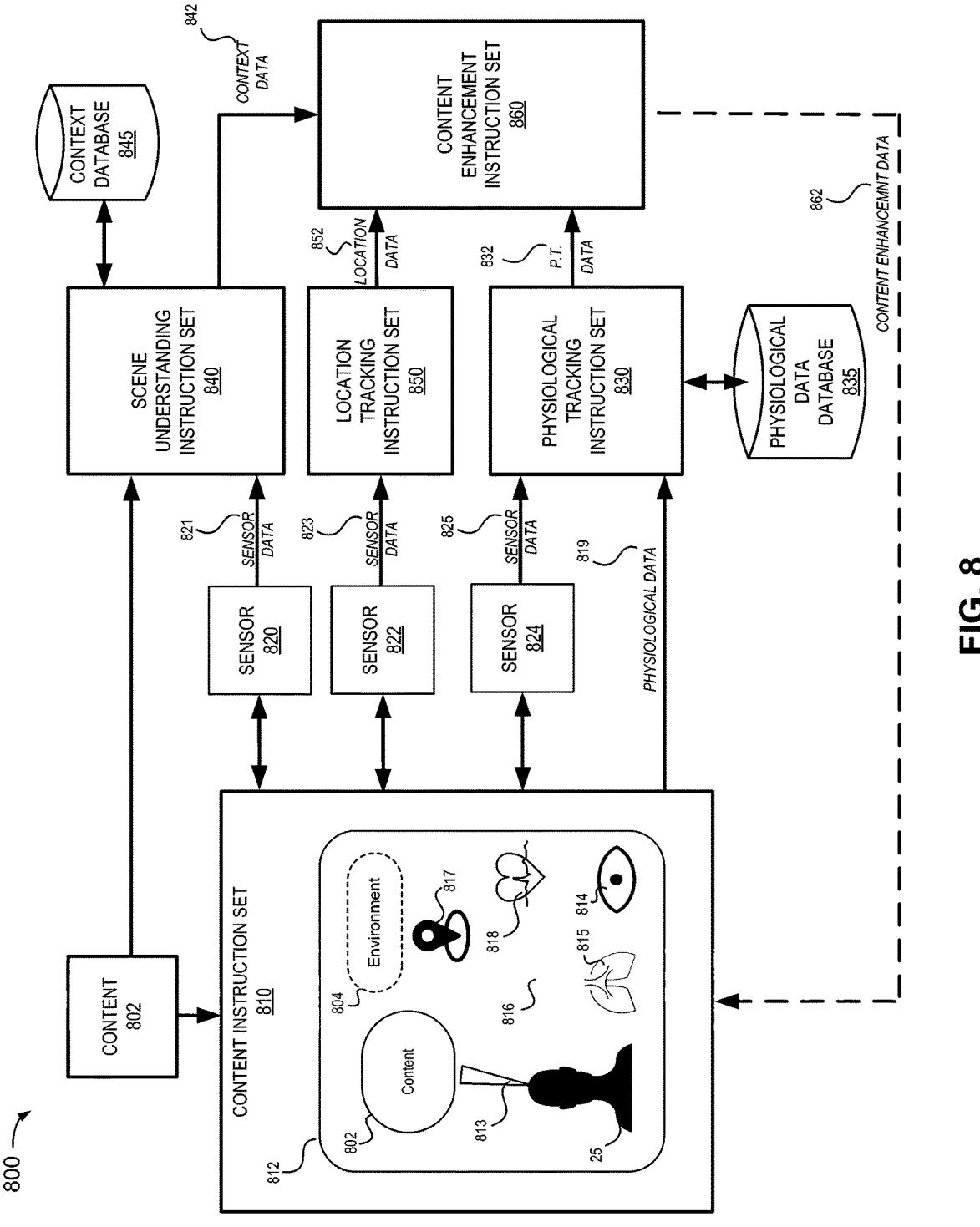
FIG. 8 illustrates a system diagram for assessing a scene understanding of a physical environment, a user state, and a position of user in the physical environment viewing content in accordance with some implementations.

FIG. 8 is a system flow diagram of an example environment 800 in which a system can assess a scene understanding of a physical environment, a user state, and a position of user in the physical environment based on sensor data, and provide content enhancement(s) within the presentation of the content according to some implementations. In some implementations, the system flow of the example environment 800 is performed on a device (e.g., device 10 of FIG. 1), such as a mobile device, desktop, laptop, or server device. The content of the example environment 800 can be displayed on a device (e.g., device 10 of FIG. 1) that has a screen (e.g., display 15) for displaying images and/or a screen for viewing stereoscopic images such as an HMD. In some implementations, the system flow of the example environment 800 is performed on processing logic, including hardware, firmware, software, or a combination thereof. In some implementations, the system flow of the example environment 800 is performed on a processor executing code stored in a non-transitory computer-readable medium (e.g., a memory).

The system flow of the example environment 800 acquires and presents content (e.g., video content or a series of image data) to a user (e.g., a meditation experience), obtains physiological data associated with the user during presentation of the content, assesses a state of a user (e.g., respiratory state, attention state, cognitive state, etc.) based on physiological data, location data, image data, and the like, of the user, and provides a content enhancement based on the data (e.g., provides a meditation path for the user 25 to follow during a meditation walking experience). In some implementations, the example environment 800 also analyzes the content and/or the environment for context data, and provides a content enhancement based on the state of the user, user's location, and the context data. For example, a user state assessment technique described herein determines, based on obtained physiological data, a user's physiological state during an experience (e.g., watching a meditation video) by providing a content enhancement that is based on the state of the user (e.g., a notification, auditory signal, an alert, an icon, and the like, that alerts the user that they may be at a particular respiratory state and the attention state during the presentation of content).

The example environment 800 includes a content instruction set 810 that is configured with instructions executable by a processor to provide and/or track content 802 for presentation on a device (e.g., device 10 of FIG. 1). For example, the content instruction set 810 provides content presentation instant 812 that includes content 802 to a user 25 while user is within a physical environment 804 (e.g., a room, outside, etc.). For example, content 802 may include background image(s) and sound data (e.g., a video). The content presentation instant 812 could be an XR experience (e.g., a meditation experience) that includes some virtual content and some images of a physical environment (e.g., a meditation walking experience while viewing a nature scene). Alternatively, the user could be wearing an HMD and is looking at a real physical environment either via a live camera view, or the HMD allows a user to look through the display, such as wearing smart glasses that a user can see through, but still be presented visual and/or audio cues. During an experience, while a user 25 is viewing the content 802, tracking of the user's respiratory rate (e.g., respiratory data 815) and pupillary data 814 (e.g., pupillary data 40 such as eye gaze characteristic data) and sent as physiological data 819. Additionally, other physiological data can be monitored and sent as physiological data 819, such as EDA data 816 and heart rate data 818. Moreover, other data can be monitored such as location data 817 sent as sensor data 823 to the location tracking instruction set 850, and image and/or depth data sent as sensor data 821 to the scene understanding instruction set 840.

The environment 800 further includes a physiological tracking instruction set 830 to track a user's physiological attributes as physiological tracking data 832 using one or more of the techniques discussed herein or as otherwise may be appropriate. For example, the physiological tracking instruction set 830 may acquire physiological data 819 (e.g., pupillary data 814 and respiratory data 815) from the user 25 viewing the content 802. Additionally, or alternatively, a user 25 may be wearing a sensor 824 (e.g., sensor 17 of FIG. 1, such as an EEG sensor, an EDA sensor, heart rate sensor, etc.) that generates sensor data 825 (e.g., EEG data, respiratory data 815, EDA data 816, heart rate data 818, etc.) as additional physiological data. Thus, as the content 802 is presented to the user as content presentation instant 812, the physiological data 819 (e.g., pupillary data 814 and respiratory data 815) and/or sensor data 825 is sent to the physiological tracking instruction set 830 to track a user's physiological attributes as physiological tracking data 832, using one or more of the techniques discussed herein or as otherwise may be appropriate. Alternatively, the physiological tracking instruction set 830 obtains physiological data associated with the user 25 from a physiological database 835 (e.g., if the physiological data 819 was previously analyzed by the physiological tracking instruction set, such as during a previously viewed/analyzed video).

In an example implementation, the environment 800 further includes a scene understanding instruction set 840 that is configured with instructions executable by a processor to obtain the experience data presented to the user (e.g., content 802) and other sensor data (e.g., image data of the environment 804, the user's 25 face and/or eye's, etc.), and generate a scene understanding as context data 842 (e.g., identifying people, objects, etc. of the content 802 and the environment 804). For example, the scene understanding instruction set 840 acquires content 802 and sensor data 821 (e.g., image data) from the sensor 820 (e.g., an RGB camera, a depth camera, etc.) and determines context data 842 based on identifying areas of the content while the user is viewing the presentation of the content 802 (e.g., a first time viewed content/video). Sensors 820, 822, and 824 are illustrated as separate blocks (sensors), however, in some implementations, sensor 820, sensor 822, and sensor 824 are the same sensor.

Alternatively, the scene understanding instruction set 840 selects context data associated with content 802 from a context database 845 (e.g., if the content 802 was previously analyzed by the context instruction set, such as during a previously viewed/analyzed video). In some implementations, the scene understanding instruction set 840 generates a scene understanding associated with content 802 and/or environment 804 as the context data 842. For example, the scene understanding can be utilized to track the overall context of what the user may be focused on during the presentation of content 802, or where the user is, what the user is doing, what physical objects or people are in the vicinity of the user with respect to the environment 804.

In an example implementation, the environment 800 further includes a location tracking instruction set 850 that is configured with instructions executable by a processor to obtain sensor data (e.g., RGB data, depth data, etc.) and track a location of a moving device (e.g., device 10) in a 3D coordinate system using one or more techniques. For example, the location tracking instruction set 850 analyzes RGB images from a light intensity camera with a sparse depth map from a depth camera (e.g., time-of-flight sensor), plane extraction data (e.g., plane estimation parameters), and other sources of physical environment information (e.g., camera positioning information such as VIO data, or a camera's SLAM system, GPS data, or the like) to generate tracking location data 852 by tracking device location information for scene understanding algorithms.

In an example implementation, the environment 800 further includes a content enhancement instruction set 860 that is configured with instructions executable by a processor to assess the physiological data 832, the context data 842, and the location data 852, using one or more of the techniques discussed herein or as otherwise may be appropriate. For example, the physiological state of the user 25 may be assessed by determining where the user's respiratory state and/or attention state may be with respect to an indicator, such as the respiratory scale 340 and the attention scale 330 of FIGS. 3 and 4. In particular, the content enhancement instruction set 860 acquires physiological tracking data 832 from the physiological tracking instruction set 830, tracking location data 852, and context data 842 from the scene understanding instruction set 840 (e.g., scene understanding data) and determines the physiological state of the user 25 during the presentation of the content 802 and based on attributes of the physical environment 804 that the user is watching the content 802. For example, the context data 842 may provide a scene analysis that can be used by the content enhancement instruction set 860 to understand what the person is looking at, where they are at, etc., and improve the determination of the respiratory state and the attention state. In some implementations, the content enhancement instruction set 860 can then provide content enhancement data 862 (e.g., visual and/or audible cues) to the content instruction set 810 based on the respiratory state and the attention state assessment. For example, finding defined markers of high/low levels of attention and respiration (e.g., visual respiratory indicator 410), and providing performance feedback during a meditation experience that could enhance a user's meditation experience, provide additional benefits from the meditation session, and provide a guided and supportive teaching approach (e.g., a scaffolding teaching method) for users to advance through their meditation practice.

In some implementations, the content enhancement data 852 could be utilized by the content instruction set 810 to present an audio and/or visual feedback cue or mechanism to the user 25 to relax and focus on breathing during the high-level stress situation (e.g., overanxious about an upcoming test). In an educational experience, the feedback cue to the user could be a gentle reminder (e.g., a soothing or calming visual and/or audio alarm) to get back on task of studying, based on an assessment that the user 25 is mind wandering because the user 25 was bored (e.g., a low-level attention indication).

FIG. 9 is a flowchart illustrating an exemplary method 900. In some implementations, a device such as device 10 (FIG. 1) performs the techniques of method 900 to assess a scene understanding of a physical environment, a user state, and a position of user in the physical environment based on sensor data, and dynamically generate a sequence of content for a change of the position corresponding to the user within an XR environment. In some implementations, the techniques of method 900 are performed on a mobile device, desktop, laptop, HMD, or server device. In some implementations, the method 900 is performed on processing logic, including hardware, firmware, software, or a combination thereof. In some implementations, the method 900 is performed on a processor executing code stored in a non-transitory computer-readable medium (e.g., a memory).

At block 902, the method 900 determines a scene understanding of a physical environment. The scene understanding may be determined based on obtaining sensor data corresponding to the physical environment. For example, determining a scene understanding may include identifying one or more of the objects in a room and their respective positions in the room based on images the user's current room, depth data, etc. For example, determining a scene understanding may include identifying the statue 520 and chair 522 in the physical environment 500 (FIGS. 5A-5C), as the user is walking in the room and viewing a meditation experience (e.g., a meditative walk).

In some implementations, the sensor data includes image data such as light intensity image data and/or depth data from one or more depth sensors (e.g., a structured light, a time-of-flight, or the like) of the physical environment. In some implementations, the sensor data includes location data of the user (e.g., user 25) and/or the device (e.g., device 10).

In some implementations, the sensor data includes physiological data. The physiological data may include EEG amplitude/frequency, image data of the user's face, pupil modulation, eye gaze saccades, EDA, heart rate, and the like. For example, obtaining the physiological data may involve obtaining images of the eye or EOG data from which gaze direction/movement can be determined, electrodermal activity/skin conductance, heart rate, via sensors on a watch. Additionally, facial recognition via HMD may be included as physiological data (e.g., reconstruction of the user's face).

At block 904, the method 900 determines a state of a user based on physiological data obtained via one or more physiological sensors. The state of the user (also referred to herein as "user's state") may include an attentive state such as mind wandering or a focused state. Additionally, or alternatively, the user's state may include a respiratory state, a cognitive state, or another physiological state. The physiological sensors may include sensors on a device worn by the user (e.g., sensor 17 of FIG. 1, such as an EDA sensor on the back of a watch). The obtained physiological data may include measuring gaze (such as eye gaze stability) because, in the context of breath tracking, mind wandering tends to result in greater eye movement. Additionally, the obtained physiological data may include overall body stability data.

In some implementations, user state may include a motion state (e.g., a stationary state, a moving state, etc.). For example, sitting or being stationary could invoke a full XR meditation experience, and walking and/or standing could trigger an XR walking experience where you still see some of the physical environment, such as the ground/path.

In some implementations, a machine learning model may be used to determine the user state based on physiological data, and audio/visual content of the experience and/or the environment. For example, one or more physiological characteristics may be determined, aggregated, and used to classify the user's state using statistical or machine learning techniques. In some implementations, the response may be compared with the user's own prior physiological responses or typical user physiological responses to similar content of a similar experience and/or similar environment attributes.

In some implementations, obtaining the physiological data associated with a physiological response of the user includes monitoring for a response or lack of response occurring within a predetermined time following the presenting of the content or a user performing a task. For example, the system may wait for up to five seconds after an event within the video to see if a user looks in a particular direction (e.g., a physiological response).

In some implementations, obtaining physiological data (e.g., pupillary data 40) is associated with a gaze of a user that may involve obtaining images of the eye or electrooculography signal (EOG) data from which gaze direction and/or movement can be determined. In some implementations, the physiological data includes at least one of skin temperature, respiration, photoplethysmogram (PPG), electrodermal activity (EDA), eye gaze tracking, and pupillary movement that is associated with the user.

Some implementations obtain physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user will have the ability to access and otherwise find out anything that the system has collected or determined about him or her. User data is stored securely on the user's device. User data that is used as input to a machine learning model is stored securely on the user's device, for example, to ensure the user's privacy. The user's device may have a secure storage area, e.g., a secure enclave, for securing certain user information, e.g., data from image and other sensors that is used for face identification, face identification, or biometric identification. The user data associated with the user's body and/or attention state may be stored in such a secure enclave, restricting access to the user data and restricting transmission of the user data to other devices to ensure that the user data is kept securely on the user's device. User data may be prohibited from leaving the user's device and may be used only in machine learning models and other processes on the user's device.

In some implementations, the state of the user may be determined based on using the physiological data to determine head pose, sounds, jaw movement, cheek movement, nose movement, movement of tissue surrounding an eye, or a signal of a face modulated by breath (e.g., PPG). For example, the determined respiratory state may be approximately 7 breaths per minute, as illustrated by the respiratory scale 340 of FIG. 3B. In some implementations, determining a respiratory state may involve sensor fusion of different acquired data without using an additional respiratory sensor. For example, the different acquired data that may be fused may include head pose data from an IMU, audio from a microphone, camera images of the user's face and/or body (e.g., an HMD with a jaw cam, down cam, eye cam for tissue around the eye, and the like), motion of the body, and/or signal of the face modulated by the breath (e.g., remote PPG). Using this type of sensor fusion to track the breathing of the user, such as while wearing an HMD, may negate the need for a user to wear a sensor worn around the user's diaphragm, for example, to track his or her respiratory rates.

In some implementations, a state of a user may be determined based on the obtained physiological data and the context of the experience. For example, a machine learning model may be used to determine the user state (e.g., attention state) based on eye tracking and other physiological data, and audio/visual content of the experience and/or the environment. For example, one or more physiological characteristics may be determined, aggregated, and used to classify the user's state using statistical or machine learning techniques. In some implementations, the response may be compared with the user's own prior responses or typical user responses to similar content of a similar experience and/or similar environment attributes. In some implementations, the user state is determined based on using the physiological data to measure gaze or body stability. In some implementations, the user state is determined based on determining a level of attentiveness. In some implementations, the state of a user is determined based on the respiratory state (e.g., a particular range of a respiratory rate may indicate the user is focused on a task).

In some implementations, determining that the user has a particular threshold of attention (e.g., high, low, etc.) includes determining a level of attention as a sliding scale. For example, the system could determine a level of attention as an attention barometer that can be customized based on the type of content shown during the user experience. If a high level of attention, if for education, a content developer can design an environment for the experience that will provide the user the "best" environment for a learning experience. For example, tune the ambience lighting so the user can be at the optimal levels to learn during the experience.

In some implementations, a state of a user may be determined by using statistical or machine learning-based classification techniques. For example, determining that the user has a respiratory state and an attention state includes using a machine learning model trained using ground truth data that includes self-assessments in which users labelled portions of experiences with respiratory state and the attention state labels. For example, to determine the ground truth data that includes self-assessments, a group of subjects, while watching meditation video, could be prompted at different time intervals (e.g., every 30 seconds). Alternatively, or additionally, the ground truth data that includes self-assessments while watching a video includes different examples of meditation events. For example, after each "meditation event", each subject could be prompted at or after a particular meditation event in the video content to enter his or her user state (e.g., respiratory state and attention state).

In some implementations, the method 900 further includes identifying emotional states of the user corresponding to multiple periods of time, and presenting indications of progress based on the emotional states. For example, identifying emotional states of the user maybe based on user input or feedback during the presentation of content (e.g., an emotional log during the meditation experience) and/or identifying emotional states of the user may be based on the obtained physiological data.

In some implementations, the content is presented to multiple users during a communication session. For example, a couple or a group of people (e.g., 2 or more) may share a meditation experience together in an XR environment. The shared experience may include an instructor and a patient, where the instructor (or any other person) can educate the user on ways to better meditate during presentation of the content (e.g., follow a particular path, or focus on particular visual and/or audio content, such as a bird chirping or a waterfall).

In some implementations, one or more pupillary or EEG characteristics may be determined, aggregated, and used to classify the state of the user using statistical or machine learning techniques. In some implementations, the physiological data is classified based on comparing the variability of the physiological data to a threshold. For example, if the baseline for a user's EEG data is determined during an initial segment of time (e.g., 30-60 seconds), and during a subsequent segment of time following an auditory stimulus (e.g., 5 seconds) the EEG data deviates more than $+/-10\%$ from the EEG baseline during the subsequent segment of time, than the techniques described herein could classify the user as transitioned away from the high respiratory state and the attention state and entered a second lower respiratory state and the attention state. Similarly, the heart rate data and/or EDA data may also be classified based on comparing the variability of the heart rate data and/or EDA data to a particular threshold.

In some implementations, the machine learning model is a neural network (e.g., an artificial neural network), decision tree, support vector machine, Bayesian network, or the like. These labels may be collected from the user beforehand, or from a population of people beforehand, and fine-tuned later on individual users. Creating this labeled data may require many users going through an experience (e.g., a meditation experience) where the users listen to natural sounds with intermixed natural-probes (e.g., an auditory stimulus) and then randomly are asked how focused or relaxed they were (e.g., respiratory state and the attention state) shortly after a probe was presented. The answers to these questions can generate a label for the time prior to the question and a deep neural network or deep long short term memory (LSTM) network might learn a combination of features specific to that user or task given those labels (e.g., low user state, high user state, etc.).

At block 906, the method 900 tracks a position corresponding to the user in the physical environment. For example, location data 317 may be obtained for the device 10 and/or of the user 25 as the user moves within in the physical environment while viewing the XR environment (e.g., walks along a meditation path such as path segment 610 and path segment 612).

At block 908, the method 900 generates a sequence of content within an XR environment. The sequence of content may be determined based on the scene understanding, the state of the user, and the position corresponding to the user in the physical environment. At block 910, the method 900 presents the sequence of content. In some implementations, the presented sequence of content includes an XR experience (e.g., a meditation session). For example, the content may present a path for the user to follow (e.g., path notification 550).

In some implementations, presenting the sequence of content includes presenting a view of a portion of the physical environment corresponding to the guiding path. For example, a sequence of content may be generated as a user walks down a path that provides a view of at least a portion of the physical environment and a portion of virtual content (e.g., a meditation walk).

In some implementations, the content may be selected to control a level of immersion based on user position and/or user state (e.g., lower immersion when walking, higher when stationary). In some implementations, an enhancement may be the start or end of a meditation experience or a change during an ongoing experience. In some implementations, a change in the weather or time of day. In some implementations, the system can detect and remove/fade away potential distractions (e.g., representation 740 of bystander 720 is faded away in FIG. 7B). In some implementations, objects can be replaced, and/or an appearance of an object can be based on physiological data. For example, the sun may be replaced with the moon and its appearance can be made to pulse based on the user's breath rate, or have virtual grass can be made to sway based on breath (e.g., a feedback mechanism to visualize a corresponding physiological signal, such as breath). In some implementations, the system can provide a user with the ability to change time of day via slide bar (e.g., interactive indicator 750 of FIGS. 7A-7C). In some implementations, the system can escalate explicitness from subtle cues to direct instructions. In some implementations, the system can use spatialized audio to redirect attention. In some implementations, the system can provide simultaneous/combined feedback regarding a user state, such as respiratory state and/or attentive state.

In some implementations, generating the sequence of content includes determining a guiding path based on the scene understanding, the state of the user, and the position corresponding to the user in the physical environment. In some implementations, presenting the sequence of content includes displaying guiding indicators to guide the user to move the device to a new position associated with the guiding path. In some implementations, the guiding indicators include a spatialized audio element that guides the viewer to the new position (e.g., an audio notification may include: "walk to the right of the tree" when trying to avoid walking into the statue 520 in FIG. 5A). In some implementations, the path may be a view of the physical environment, and other portions of the environment may be virtual.

In some implementations, the sequence of content includes a change in time (e.g., daylight to dark), and/or a change in weather (e.g., sunny to rain). For example, as illustrated in FIGS. 7A-7C, the user 25 is currently viewing a city landscape in the morning (e.g., the sun rising to the left of the city). However, in FIG. 7B, the user (or the system) has changed the XR environment (view 715B) to show an afternoon/evening, with the sun setting to the right of the city landscape, even though the user 25 is still physically present in physical environment 700 in the morning. Additionally, in FIG. 7C, the weather in the XR environment (view 715C) is now displaying rain and a moon (e.g., nighttime), even though the user 25 is still physically present in physical environment 700 in the morning with no rain. In some implementations, the change in time or the change in weather is based on user input. For example, user 25 has the ability to change the time of day or weather via the slide bars as shown in the interactive indicator 750.

In some implementations, the sequence of content includes initiation of a new meditation, conclusion of a meditation, or changing of an ongoing meditation. For example, providing a user with a meditation session for walking along a virtual path with virtual scenery as illustrated in FIGS. 5A-5B.

In some implementations, the sequence of content includes a visual or audible representation of the state of the user or a change to the state of the user. In some implementations, the sequence of content includes a cue configured to trigger a change in the state of the user. In some implementations, the sequence of content includes a graphical indicator or sound configured to change a first state to a second state. For example, as illustrated in FIG. 4, providing a user with visual respiratory indicator 410 to help the user try and control his or her breathing rate.

In some implementations, the sequence of content includes a visual or audible indication of a suggested time for an experience. For example, providing a user a notification to mediate for twenty minutes after detecting a stressful event(s), such as studying for a test.

In some implementations, the sequence of content is presented to multiple users during a communication session. For example, a copresence meditation session, such as walking together along the same meditation path. In some implementations, during the copresence meditation session, each user may be shown a view of the other user's avatars. Alternatively, during the copresence meditation session, each user may be shown a view of the actual person, but the remaining scene would include the virtual reality of the meditation path. In some implementations, during the copresence meditation session, each user may be shown a view of a mixture or blend of other users' avatar and a real view of the other users (e.g., a mixed level of immersion). \

In some implementations, determining a scene understanding may include identifying one or more of the objects in a room and their respective positions in the room (e.g., based on images of the user's current room, depth data, etc.). Additionally, generating the sequence of content may include modifying an appearance of the one or more objects based on the position for the one or more objects and/or based on the state of the user. For example, the techniques described herein can detect and remove (or fade away) potential distractions, such as other people while meditating. In some examples, the people maybe faded away based on a threshold distance (e.g., further that 10 feet away from the viewer). For example, as illustrated in FIG. 7B, representations 740 and 742 of bystanders 720 and 722, respectively, are blurred out within the view 715B. Additionally, as the object becomes closer to the suer (e.g., less than 10 feet), then the object may fade back in within the view.

In an exemplary implementation, a body pose (e.g., standing, sitting, etc.) and/or a movement state (e.g., stationary versus moving) is determined and utilized when generating content. In some implementations, the state of the user is determined based on a body pose and/or a movement state, and generating the sequence of content includes, in accordance with a determination that the state of the user is standing or moving, generating the sequence of content to include a mixed reality walking meditation experience. Additionally, or alternatively, the state of the user is determined based on a body pose (e.g., standing, sitting) or a movement state, and generating the sequence of content includes, in accordance with a determination that the state of the user is sitting or stationary, generating the sequence of content to include a virtual reality meditation experience.

In some implementations, baseline tracking may be utilized. In an exemplary implementation, the method 900 further includes determining a baseline corresponding to the user based on the physiological data, determining a goal for the user based on the baseline, and modifying the sequence of content based on the baseline and the goal. For example, during meditation experiences, a baseline for respiratory rate may be determined and used during future meditation experiences as a goal to obtain during each experience.

In some implementations, the method 900 determines a modification to the content based on the user state. For example, the determined user state could be used to provide feedback to the user via the content enhancement which may aid the user, provide statistics to the user, and/or help content creators improve the content of the experience. In some aspects, the content enhancement may be the start or end of a meditation experience or an change during an ongoing experience.

In some implementations, the modification of the content includes a graphical indicator or sound configured to change a first attention state to a second attention state. In some implementations, the modification of the content includes a visual or audible indication of a suggested time for an experience. In some aspects, the content enhancement may provide a visualization of current respiratory state or desired/improved respiratory state such as oscillations using a shrinking and enlarging icon, such as a heart or a flower (e.g., visual respiratory indicator 410). Alternatively, an interactive icon may be used to encourage a user to breath harder/deeper, such as a virtual candle being blown out. In some aspects, the content enhancement may use subtle cues change from lighter to darker ambience and/or bells, audio, chimes.

In some implementations, the method 900 further includes presenting an instruction for the user to be attentive to breathing and assessing a level of attentiveness to breathing based on the user state, where the modification is determined based on the level of attentiveness. For example, the content enhancement may escalate explicitness from subtle cues to direct instructions (e.g., "focus on breathing"). In some aspects, the content enhancement may use spatialized audio to redirect attention. In some implementations, the modification includes a visual or audible representation of the respiratory state, and a visual or audible representation of the attention state. In some implementations, the modification includes a cue configured to trigger a change in the respiratory state or attention state.

In some implementations, the method 900 further includes determining a baseline corresponding to the user based on the physiological data, determining a goal for the user based on the baseline, and determining the modification based on the baseline and the goal. For example, in some aspects, content enhancement may provide simultaneous/combined feedback regarding the respiratory state and the attention state. For example, a sinusoidal wave of the user's respiratory rate may be shown, along with a desired sinusoidal wave that the user can try and mimic (e.g., slowing the user's respiratory rate for a particular meditation experience). In some implementations, during a meditation experience, the modification includes initiation of a new meditation, conclusion of a meditation, or changing of an ongoing meditation.

In some aspects, predicting a type of physiological status, such as meditative state (e.g., physical, cognitive, social) may be utilized by the processes described herein. In an exemplary implementation, determining a respiratory state and an attention state of the user during a portion of the experience further includes determining a type of meditation of the user based on the sensor data, and providing the content enhancement during the experience is further based on the type of meditation. For example, if the user is experiencing a low level meditation experience (e.g., mind wandering and not focused on breathing), then the content enhancement may include video and/or auditory content (e.g., a notification to "take a deep breath", or adding relaxing music) that can aid the user in obtaining a target respiratory state and/or attention state to find a better level of meditative experience.

In some implementations, feedback can be provided to a user based on determining that the respiratory state and the attention state (e.g., playing an intense video game) differs from an intended respiratory state and the attention state of the experience (e.g., content developer wants to increase the respiratory state and the attention state for a particular portion of the video game). In some implementations, the method 900 may further include presenting feedback (e.g., audio feedback such as "control your breathing", visual feedback, etc.) during the experience in response to determining that the respiratory state and the attention state differs from a second respiratory state and the attention state intended for the experience. In one example, during a portion of an educational experience in which a user is studying for a difficult test, the method determines to present feedback directing the user to focus on breathing based on detecting that the user is instead in a high respiratory state and the attention state while studying.

In some implementations, the respiratory state and the attention state is a first respiratory state and a first attention state, and the method further includes obtaining, using a sensor, first physiological data (e.g., EEG amplitude, pupil movement, etc.) associated with a physiological response (or lack of response) of the user to the content enhancement, and determining a second respiratory state and second attention state of the user based on the physiological response of the user to the content enhancement. In some implementations, the method further includes assessing the second respiratory state and the second attention state of the user based on the physiological response of the user to the content enhancement, and determining whether the content enhancement reduced stress of the user by comparing the second respiratory state and the second attention state to the first respiratory state and the first attention state. For example, the respiratory state and the attention state may be compared with the user's own prior responses or typical user responses to similar stimuli. The respiratory state and the attention state may be determined using statistical or machine learning-based classification techniques. Additionally, the determined respiratory state and the attention states could be used to provide feedback to the user/reorient the user, provide statistics to the user, or help content creators in creating a more effective meditation experience, learning experience, breathing, workday, and the like.

In some implementations, providing the content enhancement includes providing a graphical indicator or sound configured to change the respiratory state and the attention state to a second respiratory state and the second attention state corresponding to physiological data exhibited by the user in the task during the portion of the experience. In some implementations, providing the content enhancement includes providing a mechanism for rewinding or providing a break from content associated with the task (e.g., rewinding during a cooking video to replay the last step(s), or pausing an educational lecture for a study break). In some implementations, providing the content enhancement includes suggesting a time for another experience based on user state.

In some implementations, a context analysis may be obtained or generated, to determine what content the user is focusing on that is creating an increase (or decrease) in a state of the user, which may include a scene understanding of the content and/or the physical environment. In an exemplary implementation, the method 900 may further include identifying the portion of the experience associated with the respiratory state and the attention state. For example, identifying a portion of the experience associated with a particularly high respiratory state and/or low attention state (e.g., over a threshold), the data may provide a recommendation (or dissuasion) of similar content or portions of the content to the user or to help the content developer improve the content for future users. For example, maybe the goal of the content developer is to increase stress in a video game, decrease stress for a meditation experience, or increase stress if a user is "bored" while studying or at work (e.g., to improve attention/respiration performance levels).

In some implementations, the method 900 further includes adjusting content corresponding to the experience based on the state of the user (e.g., customized to the respiratory state and/or the attention state of the user). For example, content recommendation for a content developer can be provided based on determining a user state during the presented experience and changes of the experience or content presented therein. For example, the user may focus and meditate well when particular types of content are provided. In some implementations, the method 900 may further include identifying content based on similarity of the content to the experience, and providing a recommendation of the content to the user based on determining that the user has a particular user state during the experience (e.g., mind wandering). In some implementations, the method 900 may further include customizing content included in the experience based on the state of the user (e.g., breaking the content into smaller pieces).

In some implementations, content for the experience can be adjusted corresponding to the experience based on the user state differing from an intended user state for the experience. For example, content may be adjusted by an experience developer to improve recorded content for a subsequent use for the user or other users. In some implementations, the method 900 may further include adjusting content corresponding to the experience in response to determining that the user state differs from a second user state intended for the experience.

In some implementations, the method 900 determines a context of the experience based on sensor data of the environment. For example, determining a context may involve using computer vision to generate a scene understanding of the visual and/or auditory attributes of the environment—where is the user, what is the user doing, what objects are nearby. Additionally, a scene understanding of the content presented to the user could be generated that includes the visual and/or auditory attributes of what the user was watching.

In some aspects, different contexts of the content presented and the environment are analyzed to determine where the user is, what the user is doing, what objects or people are nearby in the environment or within the content, what the user did earlier (e.g., meditated in the morning). Additionally, context analysis may include image analysis (semantic segmentation), audio analysis (jarring sounds), location sensors (where user is), motion sensors (fast moving vehicle), and even access other user data (e.g., a user's calendar). In an exemplary implementation, the method 900 may further include determining the context of the experience by generating a scene understanding of the environment based on the sensor data of the environment, the scene understanding including visual or auditory attributes of the environment and determining the context of the experience based on the scene understanding of the environment.

In some implementations, the sensor data includes image data, and generating the scene understanding is based at least on performing semantic segmentation of the image data and detecting one or more objects within the environment based on the semantic segmentation. In some implementations, determining the context of the experience includes determining an activity of the user based on the scene understanding of the environment. In some implementations, the sensor data includes location data of the user, and determining the context of the experience includes determining a location of the user within the environment based on the location data.

In some implementations, determining the context of the experience may involve identifying an object or individual with which the user is interacting. Determining the context of the experience may involve determining that the user is conversing with another individual. Determining the context of the experience may involve determining that an interaction or conversation with another individual is likely (or unlikely) to evoke a stressful state in the user. Assessing whether an individual is more or less likely to evoke a stressful response for the user may involve identifying the individual, and classifying the individual based on appearance of the individual, based on an action of the individual, and/or based on an activity that the individual is engaged in. For example, if the other individual is identified as the user's boss at work, the boss can be identified via facial recognition, or be classified as a supervising coworker. The stress of the user can then be tracked based on his or her respiratory state and the attention states when interacting with that individual that was classified as his or her boss. Providing feedback to a user (or his or her instructor) regarding the user's higher respiratory state and the attention states when interacting with his or her boss, may be useful when evaluating stress therapy techniques to better cope with high stress situations. Additionally, the shared experience may include a group of users sharing the common interest of meditating as a group, where the XR environment would enhance to the group's collective experience and/or an individual's experience.

In some implementations, determining the context of the experience may involve determining a scene understanding or scene knowledge that a particular location (e.g., a particular room, building, etc.) that a user experiences is more or less likely to lead to a stressful state (e.g., based on past stressful experiences that occurred there). Determining a scene understanding or scene knowledge of an experience may involve monitoring low level characteristics of a scene that can evoke stress. For example, loud noises, looming sounds, bright flashes of light, sirens, rumbling sounds, and the like, may be monitored and analyzed as part of the scene understanding or scene knowledge. Additionally, scene knowledge may provide information that a particular activity or content might be troubling or stressful. For example, scene knowledge may include experiences or event that the user is currently participating in such as interviewing, reading a disturbing news story, watching a scary movie, playing a violent video game, and the like. Understanding scene knowledge may involve other stressful experiences such as threatening stimuli (e.g., an aggressive dog), harm done to a loved one, perceived physical danger to the user (e.g., an oncoming car), online bullying, being berated in person, and the like.

In some implementations, determining the context of the experience includes determining an activity of the user based on a user's schedule. For example, the system may access a user's calendar to determine if a particular event is occurring when the particular respiratory state and the attention state is assessed (e.g., a scheduled meditation session, the user is late for an important meeting or class, or is scheduled to present in front of a group in the near future).

In some implementations, the techniques described herein obtain physiological data (e.g., pupillary data 40, EEG amplitude/frequency data, pupil modulation, eye gaze saccades, heart rate data, EDA data, etc.) from the user based on identifying typical interactions of the user with the experience. For example, the techniques may determine that a variability of an eye gaze characteristic of the user correlates with an interaction with the experience. Additionally, the techniques described herein may then adjust a visual characteristic of the experience or adjust/change a sound associated with the content enhancement, to enhance physiological response data associated with future interactions with the experience and/or the content enhancement presented within the experience. Moreover, in some implementations, changing a content enhancement after the user interacts with the experience informs the physiological response of the user in subsequent interactions with the experience or a particular segment of the experience. For example, the user may present an anticipatory physiological response associated with the change within the experience. Thus, in some implementations, the technique identifies an intent of the user to interact with the experience based on an anticipatory physiological response. For example, the technique may adapt or train an instruction set by capturing or storing physiological data of the user based on the interaction of the user with the experience, and may detect a future intention of the user to interact with the experience by identifying a physiological response of the user in anticipation of the presentation of the enhanced/updated experience.

In some implementations, an estimator or statistical learning method is used to better understand or make predictions about the physiological data (e.g., pupillary data characteristics, EEG data, EDA data, heart rate data, etc.). For example, statistics for EEG data may be estimated by sampling a dataset with replacement data (e.g., a bootstrap method).

In some implementations, the techniques could be trained on many sets of user's physiological data and then adapted to each user individually. For example, content creators can customize an education experience (e.g., an instructional cooking video) based on the user physiological data, such as a user may require background music, different ambient lighting for learning, or require more or less audio or visual cues to continue to maintain meditation.

In some implementations, customization of the experience could be controlled by the user. For example, a user could select the experience he or she desires, such as he or she can choose the ambience, background scene, music, etc. for the meditation walk. Additionally, the user could alter the threshold of providing the content enhancement. For example, the user can customize the sensitivity of triggering the content enhancement based on prior experience of a meditation session. For example, a user may desire to not have as many feedback notifications and allow some mind wandering (e.g., eye position deviations) before a notification is triggered. Thus, particular experiences can be customized on triggering a threshold when higher criteria is met. For example, some experiences, such as an education experience, a user may not want to be bothered during a study session if he or she is briefly staring off task or mind wandering by briefly looking towards a different area for a moment (e.g., less than 30 seconds) to contemplate what he or she just read. However, the student/reader would want to be given a notification if he or she is mind wandering for a longer period (e.g., longer than or equal to 30 seconds) by providing a content enhancement such as an auditory notification (e.g., "wake up").

In some implementations, the techniques described herein can account for real-world environment 5 of the user 25 (e.g., visual qualities such as luminance, contrast, semantic context) in its evaluation of how much to modulate or adjust the presented content or content enhancements to enhance the physiological response (e.g., pupillary response) of the user 25 to the visual characteristic 30 (e.g., content enhancement).

In some implementations, the physiological data (e.g., pupillary data 40) may vary in time and the techniques described herein may use the physiological data to detect a pattern. In some implementations, the pattern is a change in physiological data from one time to another time, and, in some other implementations, the pattern is series of changes in physiological data over a period of time. Based on detecting the pattern, the techniques described herein can identify a change in the respiratory state and the attention state of the user and can then provide a content enhancement (e.g., visual or auditory cue to focus on breathing) to the user 25 to return to an intended state (e.g., lower respiratory state and the attention states) during an experience. For example, a state of a user 25 may be identified by detecting a pattern in a user's gaze characteristic, heart rate, and/or PDA data, a visual or auditory cue associated with the experience may be adjusted (e.g., a content enhancement of a voice that states "focus on breathing" may further include a visual cue or a change in ambience of the scene), and the user's gaze characteristic, heart rate, and/or PDA data compared to the adjusted experience can be used to confirm the respiratory state and the attention state of a user.

In some implementations, the techniques described herein can utilize a training or calibration sequence to adapt to the specific physiological characteristics of a particular user 25. In some implementations, the techniques present the user 25 with a training scenario in which the user 25 is instructed to interact with on-screen items (e.g., feedback objects). By providing the user 25 with a known intent or area of interest (e.g., via instructions), the techniques can record the user's physiological data (e.g., pupillary data 40) and identify a pattern associated with the user's physiological data. In some implementations, the techniques can change a visual characteristic 30 (e.g., a content enhancement) associated with content 20 in order to further adapt to the unique physiological characteristics of the user 25. For example, the techniques can direct a user to mentally select a button associated with an identified area in the center of the screen on the count of three and record the user's physiological data (e.g., pupillary data 40) to identify a pattern associated with the user's respiratory state and the attention state. Moreover, the techniques can change or alter a visual characteristic associated with the content enhancement in order to identify a pattern associated with the user's physiological response to the altered visual characteristic. In some implementations, the pattern associated with the physiological response of the user 25 is stored in a user profile associated with the user and the user profile can be updated or recalibrated at any time in the future. For example, the user profile could automatically be modified over time during a user experience to provide a more personalized user experience (e.g., a personal educational experience for optimal learning experience while studying).

In some implementations, a machine learning model (e.g., a trained neural network) is applied to identify patterns in physiological data, including identification of physiological responses to presentation of content (e.g., content 20 of FIG. 1) during a particular experience (e.g., education, meditation, instructional, etc.). Moreover, the machine learning model may be used to match the patterns with learned patterns corresponding to indications of interest or intent of the user 25 to interact with the experience. In some implementations, the techniques described herein may learn patterns specific to the particular user 25. For example, the techniques may learn from determining that a peak pattern represents an indication of interest or intent of the user 25 in response to a particular visual characteristic 30 within the content and use this information to subsequently identify a similar peak pattern as another indication of interest or intent of the user 25. Such learning can take into account the user's relative interactions with multiple visual characteristics 30, in order to further adjust the visual characteristic 30 and enhance the user's physiological response to the experience and the presented content (e.g., focusing on particular areas of content versus other distracting areas).

In some implementations, the location and features of the head 27 of the user 25 (e.g., an edge of the eye, a nose or a nostril) are extracted by the device 10 and used in finding coarse location coordinates of the eyes 45 of the user 25, thus simplifying the determination of precise eye 45 features (e.g., position, gaze direction, etc.) and making the gaze characteristic(s) measurement more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move his or her head 27 and eyes 45 freely while reducing or eliminating the need to actively track the head 27 using sensors or emitters on the head 27.

By tracking the eyes 45, some implementations reduce the need to re-calibrate the user 25 after the user 25 moves his or her head 27. In some implementations, the device 10 uses depth information to track the pupil's 50 movement, thereby enabling a reliable present pupil diameter 55 to be calculated based on a single calibration of user 25. Utilizing techniques such as pupil-center-corneal reflection (PCCR), pupil tracking, and pupil shape, the device 10 may calculate the pupil diameter 55, as well as a gaze angle of the eye 45 from a fixed point of the head 27, and use the location information of the head 27 in order to re-calculate the gaze angle and other gaze characteristic(s) measurements. In addition to reduced recalibrations, further benefits of tracking the head 27 may include reducing the number of light projecting sources and reducing the number of cameras used to track the eye 45.

In some implementations, the techniques described herein can identify a particular object within the content presented on the display 15 of the device 10 at a position in the direction of the user's gaze. Moreover, the techniques can change a state of the visual characteristic 30 associated with the particular object or the overall content experience responsively to a spoken verbal command received from the user 25 in combination with the identified respiratory state and the attention state of the user 25. For example, a particular object within the content may be an icon associated with a software application, and the user 25 may gaze at the icon, say the word "select" to choose the application, and a highlighting effect may be applied to the icon. The techniques can then use further physiological data (e.g., pupillary data 40) in response to the visual characteristic 30 (e.g., a content enhancement) to further identify a respiratory state and the attention state of the user 25 as a confirmation of the user's verbal command. In some implementations, the techniques can identify a given interactive item responsive to the direction of the user's gaze, and to manipulate the given interactive item responsively to physiological data (e.g., variability of the gaze characteristics). The techniques can then confirm the direction of the user's gaze based on further identifying respiratory state and the attention states of a user with physiological data in response to interactions with the experience (e.g., interacting within an intense video game). In some implementations, the techniques can remove an interactive item or object based on the identified interest or intent. In other implementations, the techniques can automatically capture images of the content at times when an interest or intent of the user 25 is determined.

Figure 10:
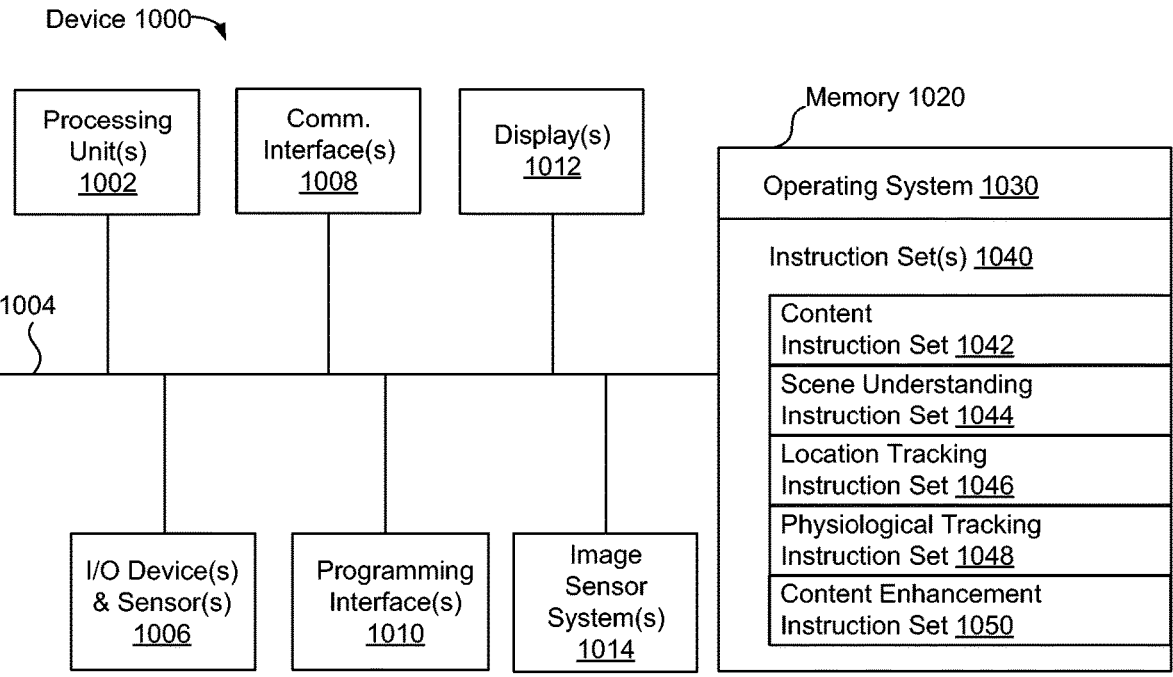
FIG. 10 illustrates device components of an exemplary device in accordance with some implementations.

FIG. 10 is a block diagram of an example device 1000. Device 1000 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/ or the like type interface), one or more programming (e.g., I/O) interfaces 1010, one or more displays 1012, one or more interior and/or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 1012 are configured to present a view of a physical environment or a graphical environment to the user. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 1012 correspond to diffractive, reflective, polarized, holographic, etc. waveguide displays. In one example, the device 10 includes a single display. In another example, the device 10 includes a display for each eye of the user.

In some implementations, the one or more image sensor systems 1014 are configured to obtain image data that corresponds to at least a portion of the physical environment 5. For example, the one or more image sensor systems 1014 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1014 further include illumination sources that emit light, such as a flash. In various implementations, the one or more image sensor systems 1014 further include an on-camera image signal processor (ISP) configured to execute a plurality of processing operations on the image data.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 includes a non-transitory computer readable storage medium.

In some implementations, the memory 1020 or the non-transitory computer readable storage medium of the memory 1020 stores an optional operating system 1030 and one or more instruction set(s) 1040. The operating system 1030 includes procedures for handling various basic system services and for performing hardware dependent tasks. In some implementations, the instruction set(s) 1040 include executable software defined by binary information stored in the form of electrical charge. In some implementations, the instruction set(s) 1040 are software that is executable by the one or more processing units 1002 to carry out one or more of the techniques described herein.

The instruction set(s) 1040 include a content instruction set 1042, a scene understanding instruction set 1044, a location tracking instruction set 1046, a physiological tracking instruction set 1048, and a content enhancement instruction set 1050. The instruction set(s) 1040 may be embodied a single software executable or multiple software executables.

In some implementations, the content instruction set 1042 is executable by the processing unit(s) 1002 to provide and/or track content for display on a device. The content instruction set 1042 may be configured to monitor and track the content over time (e.g., during an experience such as an education session) and/or to identify change events that occur within the content. In some implementations, the content instruction set 1042 may be configured to inject change events into content (e.g., content enhancements) using one or more of the techniques discussed herein or as otherwise may be appropriate. To these ends, in various implementations, the instruction includes instructions and/or logic therefor, and heuristics and metadata therefor.

In some implementations, the scene understanding instruction set 1044 is executable by the processing unit(s) 1002 to determine a context of the experience and/or the environment (e.g., create a scene understanding to determine the objects or people in the content or in the environment, where the user is, what the user is watching, etc.) using one or more of the techniques discussed herein (e.g., object detection, facial recognition, etc.) or as otherwise may be appropriate. To these ends, in various implementations, the instruction includes instructions and/or logic therefor, and heuristics and metadata therefor.

In some implementations, the location tracking instruction set 1046 is executable by the processing unit(s) 1002 to tracking a location of a user and/or a device of the user using one or more of the techniques discussed herein or as otherwise may be appropriate. To these ends, in various implementations, the instruction includes instructions and/or logic therefor, and heuristics and metadata therefor.

In some implementations, the physiological tracking instruction set 1048 is executable by the processing unit(s) 1002 to track a user's physiological attributes (e.g., EEG amplitude/frequency, pupil modulation, eye gaze saccades, heart rate, EDA data, etc.) using one or more of the techniques discussed herein or as otherwise may be appropriate. To these ends, in various implementations, the instruction includes instructions and/or logic therefor, and heuristics and metadata therefor.

In some implementations, the content enhancement instruction set 1050 is executable by the processing unit(s) 1002 to assess the physiological state (e.g., focused, distracted, etc.) of a user based on physiological data (e.g., eye gaze response), location data, and context data of the content and/or environment using one or more of the techniques discussed herein or as otherwise may be appropriate. To these ends, in various implementations, the instruction includes instructions and/or logic therefor, and heuristics and metadata therefor.

Although the instruction set(s) 1040 are shown as residing on a single device, it should be understood that in other implementations, any combination of the elements may be located in separate computing devices. Moreover, FIG. 10 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 11:
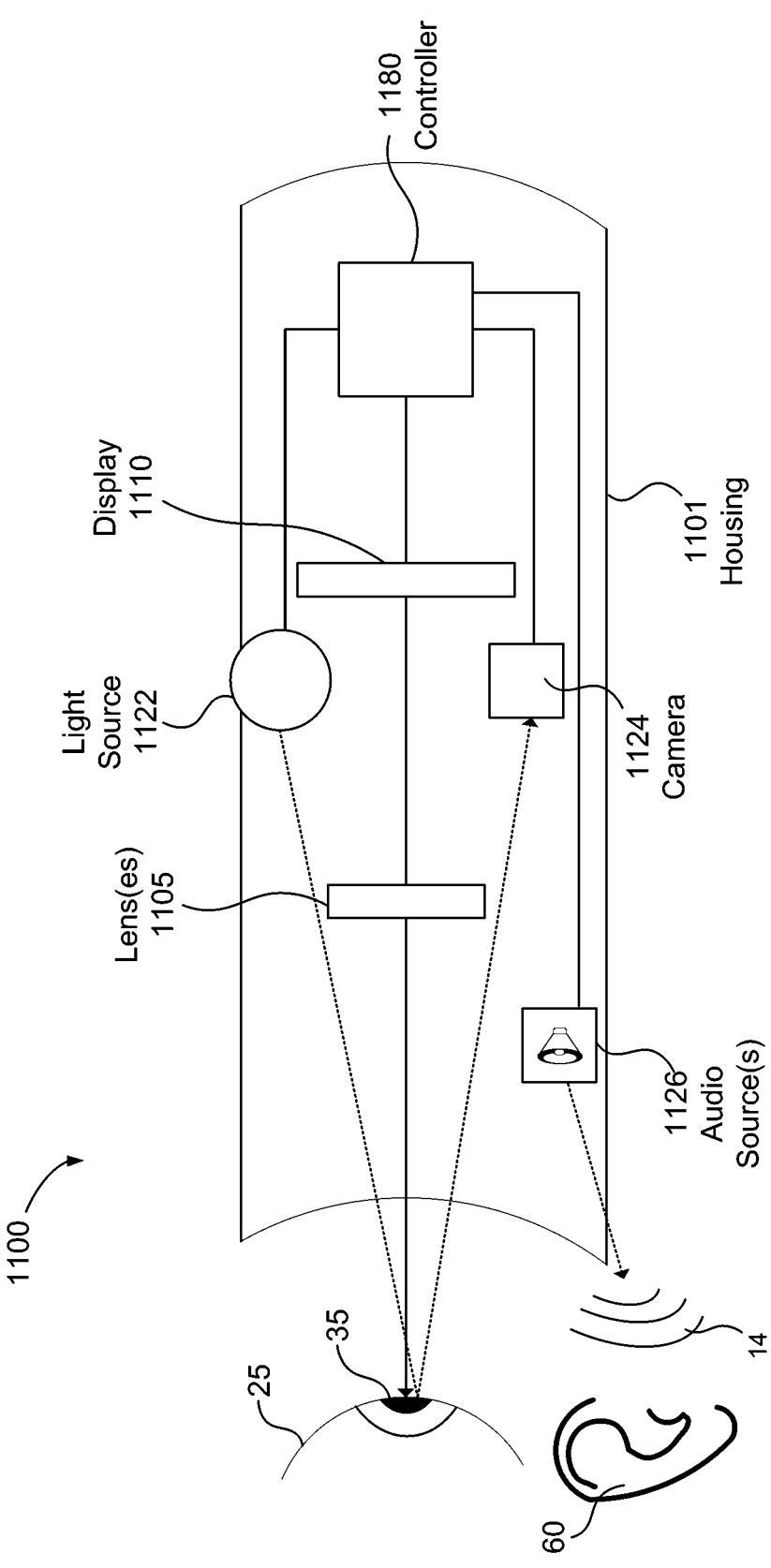
FIG. 11 illustrates an example head-mounted device (HMD) in accordance with some implementations.

FIG. 11 illustrates a block diagram of an exemplary head-mounted device 100 in accordance with some implementations. The head-mounted device 1100 includes a housing 1101 (or enclosure) that houses various components of the head-mounted device 1100. The housing 1101 includes (or is coupled to) an eye pad (not shown) disposed at a proximal (to the user 25) end of the housing 1101. In various implementations, the eye pad is a plastic or rubber piece that comfortably and snugly keeps the head-mounted device 100 in the proper position on the face of the user 25 (e.g., surrounding the eye of the user 25).

The housing 1101 houses a display 1110 that displays an image, emitting light towards or onto the eye of a user 25. In various implementations, the display 1110 emits the light through an eyepiece having one or more lenses 1105 that refracts the light emitted by the display 1110, making the display appear to the user 25 to be at a virtual distance farther than the actual distance from the eye to the display 1110. For the user 25 to be able to focus on the display 1110, in various implementations, the virtual distance is at least greater than a minimum focal distance of the eye (e.g., 8 cm). Further, in order to provide a better user experience, in various implementations, the virtual distance is greater than 1 meter.

The housing 1101 also houses a tracking system including one or more light sources 1122, camera 1124, and a controller 1180. The one or more light sources 5122 emit light onto the eye of the user 25 that reflects as a light pattern (e.g., a circle of glints) that can be detected by the camera 1124. Based on the light pattern, the controller 1180 can determine an eye tracking characteristic of the user 25. For example, the controller 1180 can determine a gaze direction and/or a blinking state (eyes open or eyes closed) of the user 25. As another example, the controller 1180 can determine a pupil center, a pupil size, or a point of regard. Thus, in various implementations, the light is emitted by the one or more light sources 1122, reflects off the eye of the user 25, and is detected by the camera 1124. In various implementations, the light from the eye of the user 25 is reflected off a hot mirror or passed through an eyepiece before reaching the camera 1124.

The housing 1101 also houses an audio system that includes one or more audio source(s) 1126 that the controller 1180 can utilize for providing audio to the user ears 60 via sound waves 14 per the techniques described herein. For example, audio source(s) 1126 can provide sound for both background sound and the content enhancement that can be presented spatially in a 3D coordinate system. The audio source(s) 1126 can include a speaker, a connection to an external speaker system such as headphones, or an external speaker connected via a wireless connection.

The display 1110 emits light in a first wavelength range and the one or more light sources 1122 emit light in a second wavelength range. Similarly, the camera 1124 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 1110 by looking at it), provide foveated rendering (e.g., present a higher resolution in an area of the display 1110 the user 25 is looking at and a lower resolution elsewhere on the display 1110), or correct distortions (e.g., for images to be provided on the display 1110).

In various implementations, the one or more light sources 1122 emit light towards the eye of the user 25 which reflects in the form of a plurality of glints.

In various implementations, the camera 1124 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1124 is an event camera including a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a device having a processor:

determining a scene understanding of a physical environment, wherein the scene understanding identifies one or more objects and is determined based on obtaining sensor data corresponding to the physical environment;

determining a state of a user based on physiological data obtained via one or more physiological sensors;

tracking a position of the user as the user moves within the physical environment;

generating a sequence of content within an extended reality (XR) environment, wherein the sequence of content comprises a guiding path, wherein the sequence of content and the guiding path are determined based on the scene understanding, the state of the user, and the position of the user as the user moves within the physical environment, and wherein the guiding path is generated based on avoiding the identified one or more objects in the physical environment; and presenting the sequence of content that includes guiding indicators to guide the user to move the device to a new position associated with the guiding path.

2. The method of claim 1, wherein the sequence of content comprises:

initiation of a new meditation;

conclusion of a meditation; or changing of an ongoing meditation.

3. The method of claim 1, wherein the sequence of content comprises:

a visual or audible representation of the state of the user or a change to the state of the user; or a cue configured to trigger a change in the state of the user.

4. The method of claim 1, wherein determining the scene understanding of the physical environment comprises determining a position for the one or more objects, wherein the method further comprises modifying an appearance of the one or more objects based on the position for the one or more objects based on the state of the user.

5. The method of claim 1, wherein the state of the user is determined based on a body pose or movement state, and wherein generating the sequence of content comprises:

in accordance with a determination that the state of the user is standing or moving, generating the sequence of content to comprise a mixed reality walking meditation experience; and in accordance with a determination that the state of the user is sitting or stationary, generating the sequence of content to comprise a virtual reality meditation experience.

6. The method of claim 1, further comprising:

determining a baseline corresponding to the user based on the physiological data;

determining a goal for the user based on the baseline; and modifying the sequence of content based on the baseline and the goal.

7. The method of claim 1, wherein the device comprises a head-mounted device (HMD).

8. The method of claim 1, wherein determining the state of the user comprises determining at least one of an attentive state and a respiratory state of the user based on the physiological data.

9. The method of claim 1, wherein presenting the sequence of content comprises modifying a level of immersion based on the state of the user.

10. The method of claim 9, wherein different levels of immersion comprise a different percentage of blurring between a view of the physical environment and virtual content during a view of the XR environment.

11. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

determining a scene understanding of a physical environment, wherein the scene understanding identifies one or more objects and is determined based on obtaining sensor data corresponding to the physical environment;

determining a state of a user based on physiological data obtained via one or more physiological sensors;

tracking a position of the user as the user moves within the physical environment;

generating a sequence of content within an extended reality (XR) environment, wherein the sequence of content comprises a guiding path, wherein the sequence of content and the guiding path are determined based on the scene understanding, the state of the user, and the position of the user as the user moves within the physical environment, and wherein the guiding path is generated based on avoiding the identified one or more objects in the physical environment; and presenting the sequence of content that includes guiding indicators to guide the user to move the device to a new position associated with the guiding path.

12. The device of claim 11, wherein the sequence of content comprises:

initiation of a new meditation;

conclusion of a meditation; or changing of an ongoing meditation.

13. The device of claim 11, wherein the sequence of content comprises:

a visual or audible representation of the state of the user or a change to the state of the user; or a cue configured to trigger a change in the state of the user.

14. The device of claim 11, wherein determining the scene understanding of the physical environment comprises determining a position for the one or more objects, wherein the program instructions, when executed on the one or more processors, further cause the one or more processors to perform operations comprising modifying an appearance of the one or more objects based on the position for the one or more objects based on the state of the user.

15. The device of claim 11, wherein the state of the user is determined based on a body pose or movement state, and wherein generating the sequence of content comprises:

in accordance with a determination that the state of the user is standing or moving, generating the sequence of content to comprise a mixed reality walking meditation experience; and in accordance with a determination that the state of the user is sitting or stationary, generating the sequence of content to comprise a virtual reality meditation experience.

16. The device of claim 11, wherein the program instructions, when executed on the one or more processors, further cause the one or more processors to perform operations comprising:

determining a baseline corresponding to the user based on the physiological data;

determining a goal for the user based on the baseline; and modifying the sequence of content based on the baseline and the goal.

17. The device of claim 11, wherein the device comprises a head-mounted device (HMD).

18. A non-transitory computer-readable storage medium, storing program instructions executable on a device to perform operations comprising:

determining a scene understanding of a physical environment, wherein the scene understanding identifies one or more objects and is determined based on obtaining sensor data corresponding to the physical environment;

determining a state of a user based on physiological data obtained via one or more physiological sensors;

tracking a position of the user as the user moves within the physical environment;

generating a sequence of content within an extended reality (XR) environment, wherein the sequence of content comprises a guiding path, wherein the sequence of content and the guiding path are determined based on the scene understanding, the state of the user, and the position of the user as the user moves within the physical environment, and wherein the guiding path is generated based on avoiding the identified one or more objects in the physical environment; and presenting the sequence of content that includes guiding indicators to guide the user to move the device to a new position associated with the guiding path.

19. The non-transitory computer-readable storage medium of claim 6, wherein the sequence of content comprises:

initiation of a new meditation;

conclusion of a meditation; or changing of an ongoing meditation.

20. The non-transitory computer-readable storage medium of claim 18, wherein the sequence of content comprises:

a visual or audible representation of the state of the user or a change to the state of the user; or a cue configured to trigger a change in the state of the user.

* * * * *